(12) United States Patent
Brinskelle

(10) Patent No.: US 9,781,099 B1
(45) Date of Patent: *Oct. 3, 2017

(54) ONLINE COMMUNICATION RISKS

(71) Applicant: Jeffrey E. Brinskelle, Ottawa (CA)

(72) Inventor: Jeffrey E. Brinskelle, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,934

(22) Filed: Mar. 15, 2016

Related U.S. Application Data

(63) Continuation of application No. 14/224,871, filed on Mar. 25, 2014, now Pat. No. 9,288,190, and a continuation of application No. 12/605,300, filed on Oct. 23, 2009, now Pat. No. 8,683,052.

(60) Provisional application No. 61/107,989, filed on Oct. 23, 2008.

(51) Int. Cl.
*G06F 15/16* (2006.01)
*H04L 29/06* (2006.01)

(52) U.S. Cl.
CPC ...... *H04L 63/0823* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 2004/0088348 | A1* | 5/2004 | Yeager | H04L 67/104 709/202 |
| 2004/0215557 | A1* | 10/2004 | Michelsen | G06Q 20/10 705/39 |
| 2005/0044423 | A1* | 2/2005 | Mellmer | G06F 21/31 726/4 |
| 2007/0180225 | A1* | 8/2007 | Schmidt | H04L 9/321 713/152 |
| 2009/0037594 | A1* | 2/2009 | Sever | E21B 47/024 709/230 |

* cited by examiner

*Primary Examiner* — Peling Shaw

(57) ABSTRACT

Systems, methods, and apparatus to analyze potential risks of communicating online are described. In an embodiment, the communication may include communicating with a destination and/or communicating over a communication channel and/or communicating through a network entry and/or communicating using a client. Potential risks may be used to determine whether to proceed with online communications and/or whether the risks are prohibitive for online communications. Other embodiments are also claimed and disclosed.

20 Claims, 17 Drawing Sheets

| Communication Element | Risk Decision |
|---|---|
| Client<br>Client<br>Client | isAntiVirusSoftwareRunning()<br>isPresent(AntiVirusSoftware, AntiVirusWhiteList)<br>isPresent(AntiVirusSoftware, AntiVirusBlackList) |
| Destination<br>Destination<br>Destination<br>Destination | isPresent(Destination, ListOfValidEnterpriseDestinations)<br>isPresent(Destination.ServerSoftware, ServerBlacklist)<br>isPresent(Destination, DestinationWhiteList)<br>isPresent(Destination, DestinationBlackList) |
| CommunicationChannel<br>CommunicationChannel<br>CommunicationChannel<br>CommunicationChannel<br>CommunicationChannel<br>CommunicationChannel<br>CommunicationChannel<br>CommunicationChannel | Protocol == SSL<br>Cert.Subject == DomainName<br>notRevoked(Cert, CRL)<br>Cert.Type != ExtendedValidationCertificateType<br>isPresent(Cert, ListOfPrescreenedBanks)<br>notPresent(Cert.Issuer, IssuerBlacklist)<br>isBitSet(Cert.KeyUsage, KeyEnciph)<br>isBitSet(Cert.KeyUsage, DigSig) |
| Network<br>Network | isPresent(NetworkConnection, NetConnWhitelist)<br>isPresent(NetworkConnection, NetConnBlacklist) |

Figure 7

| Category | Risk Decisions |
|---|---|
| Banking++ | Cert.Type == ExtendedValidationCertificateType |
| Banking+ | isPresent(Cert, ListOfPrescreenedBanks) |
| Banking | (Cert.Issuer == "CA1") \|\| <br> (Cert.Issuer == "CA2") \|\| <br> (Cert.Issuer == "CA3") \|\| <br> isPresent(Cert.CPS, ListOfValidCPS) |
| Enterprise Secrets | isPresent(Destination, ListOfValidEnterpriseDestinations) |
| Online Shopping | (Cert.Subject == DomainName) && <br> notRevoked(Cert, CRL) && <br> notPresent(Cert.Issuer, IssuerBlacklist) && <br> isBitSet(Cert.KeyUsage, KeyEnciph) && <br> isBitSet(Cert.KeyUsage, DigSig) |
| Enterprise Email | isPresent(NetworkConnection, NetConnWhitelist) |
| Personal Info | ((Protocol == SSL3) \|\| (Protocol == TLS1)) && <br> !isPresent(Destination.ServerSoftware, ServerBlacklist) |
| Personal Email | isPresent(Destination, DestinationWhiteList) |
| Any Communications | !isPresent(Destination, DestinationBlackList) && <br> !isPresent(NetworkConnection, NetConnBlacklist) |

Accumulative for higher categories →

Figure 8

| Communication Element | Communication Sub-element | Acceptable Parameters |
|---|---|---|
| Client | AV | isAntiVirusSoftwareRunning() |
| Client | AV | isPresent(AntiVirusWhiteList) |
| Client | AV | isPresent(AntiVirusBlackList) |
| Destination | Hostname | isPresent(ListOfValidEnterpriseDestinations) |
| Destination | ServerSoftware | isPresent(ServerBlacklist) |
| Destination | Hostname | isPresent(DestinationWhiteList) |
| Destination | Hostname | isPresent(DestinationBlackList) |
| CommChannel | Protocol | isEqual(SSL) |
| CommChannel | Cert.Subject | isEqual(DomainName) |
| CommChannel | Cert | notRevoked(CRL) |
| CommChannel | Cert.Issuer | notPresent(IssuerBlacklist) |
| CommChannel | Cert.Type | isEqual(ExtendedValidationCertificateType) |
| CommChannel | Cert | isPresent(ListOfPrescreenedBanks) |
| CommChannel | Cert.KeyUsage | isBitSet(KeyEnciph) |
| CommChannel | Cert.KeyUsageI | isBitSet(DigSig) |
| Network | Connection | isPresent(NetConnWhitelist) |
| Network | Connection | isPresent(NetConnBlacklist) |

Figure 9

CategoryAcceptableRisksTable

| Category | Min CA Risk Rating | Min Cert Type | Min CPS Rating | Min Seen Since | Min Key Size |
|---|---|---|---|---|---|
| OnlineBanking | 9 | EV | 7 | 120 | 2048 |
| OnlineShopping | 8 | DV | 6 | 30 | 1024 |
| B2B | 7 | DV | 5 | 365 | 1024 |
| Webmail | 5 | NULL | 2 | 1 | 0 |

Figure 11

CACertRiskRatingTable

| CA | Certificate | Risk Rating |
|---|---|---|
| CA1 | base64Value1 | 5 |
| CA1 | base64Value2 | 7 |
| CA2 | base64Value3 | 9 |
| CA3 | base64Value4 | 2 |

Figure 12

CACPSRiskRatingTable

| CA | CPS | CPS Rating |
|---|---|---|
| CA1 | base64Value5 | 4 |
| CA2 | base64Value6 | 5 |
| CA2 | base64Value7 | 8 |
| CA3 | base64Value8 | 2 |

Figure 13

```
struct X509_Cert {
    X509_Cert   *Issuer;
    BigInt      SerialNumber;
    char        *SubjectKeyIdentifier;    /* SKI */
    char        *AuthorityKeyIdentifier;  /* AKI */
    int         KeySize;                  /* public key */
    char        *CertificatePolicyStatement; / CPS */
    int         certType;
}
int DetermineCACertRiskRating(X509_Cert *iCert) {
    char        *xCert = toBase64(iCert);
    return DBLookup("SELECT RiskRating FROM CACertRiskRatingTable "
        "WHERE CACertRiskRatingTable.Cert == '%s';", xCert);
}
int DetermineCertCPSRiskRating(char *iCPS) {
    return DBLookup("SELECT CPSRating FROM CACPSRiskRatingTable "
        "WHERE CACPSRiskRatingTable.CPS == '%s';", iCPS);
}
/* Returns:
    0: risks unacceptable for specified category
    1: risks are acceptable for specified category */
int DetermineRiskRating(X509_Cert *iCert, char *iCategory) {
    int cACertRating = DetermineCACertRiskRating(iCert->Issuer);

int certCPSRating = DetermineCertCPSRiskRating(iCert);

Cat category =
        DBLookup("SELECT * FROM CategoryAcceptableRisksTable "
        "WHERE CategoryAcceptableRisksTable.Category == '%s';",
        iCategory);

return ( (cACertRating > category.MinCARiskRating) &&
        (iCert->certType >= category.AllowableCertType) &&
        (certCPSRating > category.MinCPSRating) &&
        (iCert->KeySize > category.MinKeySize) );
}
/* Returns:
    0: risks unacceptable for specified category
    1: risks are acceptable for specified category */
char *DetermineAcceptableCategories(X509_Cert *iCert) {
    char *categories[] = DBLookup("SELECT Category FROM "
        "CategoryAcceptableRisksTable;");
    char *oAcceptableCategories;
    for (i=0; i<sizeof(categories); i++) {
        if (DetermineRiskRating(iCert, categories[i])) {
            oAcceptableCategories[count] = categories[i];
        }
    }
    return oAcceptableCategories;
}
```

Figure 14

ONLINE COMMUNICATION RISKS

RELATED APPLICATION

The present application is a continuation of U.S. patent application Ser. No. 14/224,871, filed Mar. 25, 2014, which is a continuation of U.S. patent application Ser. No. 12/605,300, filed Oct. 23, 2009, now U.S. Pat. No. 8,683,052, issued Mar. 25, 2014, both entitled "ONLINE COMMUNICATION RISKS," which are related to and claims priority from U.S. Provisional Patent Application entitled "ONLINE COMMUNICATION RISKS" filed Oct. 23, 2008, Ser. No. 61/107,989, all of which are incorporated herein by reference for all purposes.

FIELD

The present disclosure generally relates to the field of computer security. More specifically, an embodiment of the invention relates to determining the risks of online communications.

BACKGROUND

Users may face difficulty in determining the security of online communications and/or ensuring online communications are secure. Online communications may include transmitting or receiving data over electronic networks such as for example transmission of sensitive data, or documents containing sensitive data, performing sensitive transactions, or other electronic communications. Electronic networks may include for example the Internet, enterprise intranet, cellphone networks, wireless networks, or any other electronic communication channel.

FIG. 1 illustrates an example of online communications. As FIG. 1 shows there are numerous components involved when a user is communicating online. A client 140 may include electronic devices such as a computer, laptop, cellphone, WiFi client, WiMax client, bluetooth client, portable electronics device, Blackberry, iPod, iPhone, or the like. The client may include a software application such as for example a web browser operated by a user. In determining trust, the software application may access one or more Trusted Root Certificates (also sometimes referred to as "root certificates"). The client 140 may be subverted, or be vulnerable to attacks such as for example: malware, virus, Trusted Root Certificate manipulation, man-in-the-browser, or the like. The client 140 communicates through a network entry component 120.

The network entry component 120 may be a wired or wireless component. The network entry component 120 may intercept and/or manipulate traffic such as for example DNS hijacking, DNS spoofing, proxy injection (either transparent or visibly), or the like. The network entry component 120 may be spoofed, hijacked, masquerade as another, evil twin, compromised, provided with malicious or incorrect information, manipulated, or act as a man-in-the-middle (MITM). This may occur with or without the users knowledge. The network entry component 120 connects the client 140 through a network 110.

The network 110 may facilitate electronic communication between entities. The network 110 may contain malicious hops or intermediary's that intercept and/or manipulate communications. The network 110 may be one or more of the Internet, cell phone network, wireless network, or any other electronic communication channel. The network 110 may facilitate communications with one or more destinations 100A, 100B, 100C where a destination may be a website.

A destination 100A, 100B, 100C may be identified by for example using secure credentials such as a server certificate, or less secure identification such as a hostname, IP address, alias, or the like. However, such identification may confuse a user, or contain misleading details, or otherwise be manipulated by a malicious attacker. Online communications using Secure Sockets Layer (SSL) and/or Transport Layer Security (TLS) may be more secure but are reliant on the underlying technology as well as the user being able to parse and understanding all of the various details contained in an SSL/TLS server certificate and certificate chain.

When a user communicates online they may not be aware of or understand all of the underlying technology in use and may face difficulty determining how safe or secure their communications may be. The underlying technology may include:

Networking details (transport layers, hops, routes between client and destination, Domain Name Servers (DNS), what entities may have access to their transmitted, etc. . . . ).

Network security of their endpoint (wired network, wireless network, mobile network, enterprise, etc. . . . ). For example: wifi hotspots, motel, airport, coffeeshop, student campus, work environment, friends LAN, WiMax network, etc. . . . .

Whether appropriate security of the client is in place. For example: client-side antivirus software configured and running, etc. . . . .

What technology is in place. More and more electronic devices are portable and used by users to roam, during roaming the underlying communications technology may change from one location to another. Users may roam and travel and use networks provided at motels, coffee shops, Wifi hotspots, WiMax networks, Internet providers, visiting client offices, or the like.

Using an unknown or uncontrolled computer (such as at a library, friend or relatives computer, work computer, or the like)

Rogue or misconfigured entity (network, network entry, access point, client-side software, malicious intermediary, name servers, etc. . . . )

Destination content. For example: using a HTML web form—where their data will be transmitted to or information about the communication channel, forms may be redirected to different location than what user thinks, or malicious javascript may intervene to redirect data or traffic. Another example: destination content may contain security or design flaws that a user may not be able to recognize Using an unknown or uncontrolled network (for example: roaming with a laptop, iPod, iPhone, WiFi client over a wireless network)

State of Trusted Root Certificates of computer being used

State of vulnerabilities or patches of any or all technology being used (computer, web browser, anti-virus, anti-malware, or the like)

Users may face difficulty with X.509 certificates such as one or more of:

Understanding various technical details of a X.509 certificate

Understanding how X.509 certificates relates to a security model such as SSL/TLS, VPN, SMIME, or the like. For example, a user may face difficulty in identifying a destination using a X.509 certificate Differences between the Issuers, Policies, certificate types of X.509 and/or SSL/TLS certificates. For example, each Issuer may comply with different policies, as well an Issuer may have more than one policy.

Differences in policies in place and enforced. For example: different Certification Authorities (CAs) may use different Certificate Policy Statements (CPS) that vary in scope and intent in what they are certifying. Users may not have the ability or time to thoroughly examine such details, or they may later confuse or even forget relevant details.

Amount of due diligence by a Certification Authority (CA) in ensuring or validating the identity of an entity when certificate issued The possibility of a weak key being used (for example, a recent weakness in Debian OpenSSL implementations were as a result of weak random numbers being used)

The encryption strength of a communication channel

What details are relevant for assessing security of a certificate chain

How long a public key pair have been in use. For example: some CA's allow re-certification or renewal of the same public key multiple times thus exceeding what a certificate may show as the age of a key, the longer a key is in use the more likely it may be broken or brute force cracked Web browser certificate policies, zones, rules or the like Ramifications of one type of certificate over another such as proxy certificates, Trusted Roots, certificate types, intended uses of a certificate Variances in certificate path construction Amount of due diligence underlying applications perform verifying or validating security, or entities. For example, in an online web browsing environment, users cannot easily tell whether the web browser performed revocation checking, or to what extent they verified or validated the destination website.

Users may face difficulty with what the boundaries or thresholds are acceptable for different types, modes, or operations of online communications. For example:

What protocol(s) should be used under what circumstances and when one is required over another. For example: SSL may be used even in an insecure network as long as the destination certificate passes some tests.

What level of cryptography is sufficient for the purpose of the online communication (such as transmitting sensitive data, transmitting a document containing sensitive data, performing a transaction, or the like). For example: personal email may not require the same level of security as online banking.

Differences in certificates. For example: some CA's have different levels of certification that might be acceptable for different grades or levels of transactions.

Users may face difficulty knowing or keeping up to date with the latest security happenings such as one or more of:

Status changes for an entity or component. For example, a destination may become suspicious or unacceptable. Another example, a pattern or characteristics may emerge of the types of destination or software used of destinations as being vulnerable to an attack. Another example, information provided by an entity (such as DNS or DHCP servers) may be invalid or malicious. Another example, discovery of a security flaw in a software application such as the recent Debian OpenSSL weak random number generator.

Client software patches (e.g. web browsers, firmware, cellphone, iPods, iPhones, . . . )

Latest security updates, happenings, news, changes that affect security for communicating online Latest best security practices. For example—cryptographic algorithms, cryptographic key sizes, communication protocols, procedures, policies, or the like Evolving changes to SSL/TLS (versions, patches, etc. . . . ), X.509 certificates, certificate types (such as Extended Validation (EV)), Trusted Root Certificate changes, Object Identifiers (OIDs), certificate extensions, certificate path construction, protocol updates and deprecation of older versions, or the like Latest safe and unsafe destinations. As data breaches continue to occur, end users may find it difficult keeping up with which are safe and which are unsafe.

Users may face difficulting evaluating the level of security provided or performed by software applications. Additionally, there may be inconsistency or differences from one web browser to another, or even from one version to another.

In environments such as for example an enterprise network—a hetereogenous mixture of web browsers and/or versions may be deployed and in use. This may cause difficulties for the enterprise in understanding or controlling online communications. Additionally, each different vendor or version may decrease or worsen security. This may also increase the amount of testing required to ensure all web browsers are fully tested, and/or know which vulnerabilities potentially exist. Also users may face difficulty in knowing or keeping up to date with vulnerabilities as they are discovered.

Users may face difficulty in obtaining information needed to evaluate the risks or security of communicating online. For example, some devices may not readily provide certificate or SSL information such as current versions of the Apple iPhone or Apple iTouch. Another example, some devices may be too small to display SSL or certificate details. Another example, on some devices it may be too cumbersome to display certificate details—so certificate details may be left out or omitted.

Users may face difficulty evaluating the level of security present. The same device may present different security risks when used in different locations. Communicating using the same portable device used in one location may be safer than in another location. For example: a user using a Wifi client device may be safe connecting to their home Wifi access point but the same Wifi client device may be unsafe to use in a motel or coffee shop.

Different devices used in the same location may present different security risks. For example, a Blackberry device used in a WiFi hotspot may provide different security risks than an iPhone in the same location. However, it may be challenging for a user to distinguish such differences.

Networks may differ in the level of security they provide. For example: different vendors of the same network type (e.g. WiFi, WiMax, . . . ) may be implemented or configured differently and pose different security risks.

Network providers or wireless network aggregators may differ in terms of security that they provide. For example, Internet Service Providers (ISPs), coffee shops with Internet service, WiFi hotspots, or the like may each provide a differing level or security (or no security at all).

In a home family environment, some family members may face difficulty in protecting their online communications adequately. For example: parents may wish to protect their children from online predators or adult content, a working family member may need to communicate appropriately with their work. Another example: children may communicate online and face predatory aggressions through emails, instant messages, social networks, or the like.

A user may require user training or education in understanding and distinguishing one or more of security vulnerabilities, attacks, holes, or the like.

A user may face difficulty knowing what level of security is appropriate for different environments or what the level of security is for a specific communications environment. Attackers have a variety of attacks at their disposal that are ever evolving, as well the technology evolves or new technology comes into play.

Enterprises (such as employers, companies, organizations, or groups) may face difficulty in controlling or helping their users manage online communications.

The above are but a sample of the attacks or holes or variations, many more are possible.

Improvements in the area of the security of online communications may be useful.

SUMMARY

In accordance with some embodiments, systems, methods, and apparatus to analyze potential risks of communicating online are described. The communication may include communicating with a destination and/or communicating over a communication channel and/or communicating through a network entry and/or communicating using a client. The risks may be used to determine whether to proceed with online communications and/or whether the risks are prohibitive for online communications. The online communications may for example include transmitting sensitive data, transmitting document containing sensitive information, or performing a transaction. In some embodiments, the potential risks may be provided to or accessible by a user and used to ensure acceptable communications. In some embodiments, the risks may be used to determine which type of online communications are acceptable for the online communication. In some embodiments, the risks may be used to determine whether to allow transmission of a specific piece of data or type of data. In some embodiments, the risks may be used to provide guidance to online communications.

Additional advantages, objects, and features of embodiments of the invention are set forth in part in the detailed description which follows. It is to be understood that both the foregoing general description and the following detailed description are merely exemplary of embodiments of the invention, and are merely intended to provide an overview or framework for understanding the nature and character of embodiments of the invention.

BRIEF DESCRIPTION OF THE DRAWINGS

FIG. 5AA is a sequence diagram illustrating an example of a SSL/TLS handshake between a SSL client and SSL server, in accordance with one embodiment.

FIG. 7 is a table illustrating the risk decisions for communication elements, in accordance with one embodiment.

FIG. 8 is a table illustrating the risk decisions for categories, in accordance with one embodiment.

FIG. 9 is a table illustrating an example of risk decisions for communication elements and communication sub-elements, in accordance with one embodiment.

FIG. 11 is a table illustrating acceptable parameters for various risk categories, in accordance with one embodiment.

FIG. 12 is a table illustrating pre-assessed risk ratings for various CA certificates, in accordance with one embodiment.

FIG. 13 is a table illustrating pre-assessed risk ratings for various CPS, in accordance with one embodiment.

FIG. 14 is a C-like pseudo code listing of the algorithm to determine risk ratings for a certificate chain, in accordance with one embodiment.

DETAILED DESCRIPTION

Figure 1:
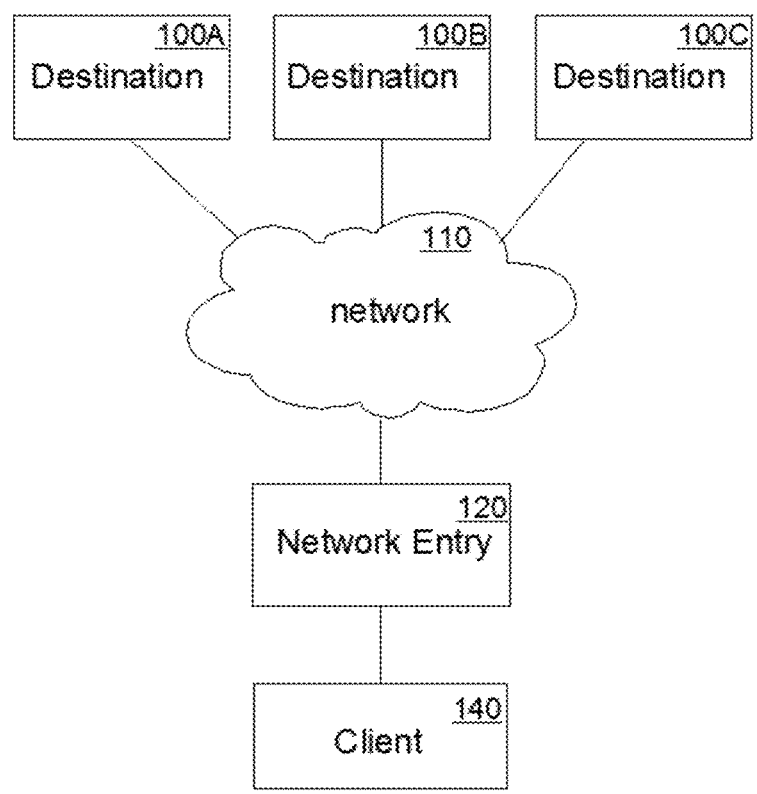
FIG. 1 is a block diagram of a network configuration illustrating a client communicating online.

Generally, online communications may include a client communicating over an electronic network with a destination using a communication channel. Online communications may include transmission of data or performing transactions. Data transmitted or operations performed may be sensitive in nature. A risk assessment may be performed to determine the risks of communicating online examining one or more details of a client, destination, communication channel, network connection. The risk information may be used by a user or another component to help determine appropriate communications.

In an embodiment, a security agent may help users by assisting in determining the risks of communicating online.

Sensitive data may include but is not limited to items or derived from items such as:
    type of the sensitive data
    login credentials
    HTTP cookies
    credit card information
    financial data
    second factor authentication (such as one-time passwords, time based tokens, grid card information)
    private cryptographic key or derivation thereof
    banking or financial institution information
    401K data
    employee salary or payroll information social security number (SSN) numbers birth information (including birth date, birth location, etc.)

mother's maiden name bill invoice information user biometric information personal health information confidential or secret enterprise data document containing sensitive data other private, personal, or identifying user information shared with limited other parties In some embodiments, a security agent deems different risks are acceptable for different sensitive data. For example, transmitting credit card information may have different acceptable risk parameters then a webmail password.

Acceptable risks may include but is not limited to:

acceptable level of risk safe level of risk appropriate security adequate security A Certification Authority (CA) is an entity that issues certificates for use by other parties.

In an embodiment, a digital certificate (such as for example an X.509 Certificate) (which may also be referred to herein more generally as a "certificate") may refer to a small data file that can be transmitted or loaded into an application (such as for example a web browser, e-mail application). Generally, a certificate may be used to bind (or link) an entity to a public key, identity, or other information. A certificate may be used to bind an attribute to an entity. Certificates typically have one or more fields or areas of storage within the file. One such field in a certificate is the Certificate Policy Statement (CPS). The CPS may be a text-based field inside the certificate that is designed to store individualized information about limitations, liabilities, agreements, contracts, or further information about the issued certificate. A CPS may contain or point to a detailed description of the practices followed by a CA in issuing and otherwise managing certificates may be contained in a certification practice statement (CPS) published by or referenced by the CA. The CPS may be binding agreement. The CPS field of the digital certificate may hold a pointer, or link, to a website that has a copy of the agreement. All parties may review and otherwise refer to the agreement at virtually any time by using an application software program that displays, allows examination of a certificate.

A certificate chain generally refers to one or more X.509 Certificates that chain to a root CA that an entity trusts.

There are different types of certificates. Extended Validation Certificates (EV) are a special type of X.509 certificate which requires more extensive investigation of the requesting entity by the Certification Authority before being issued. Another type of certificate is a Domain Validated Certificate (DV) with less strict validation—such as only validating the requesting entity has control of a domain.

Figure 2:
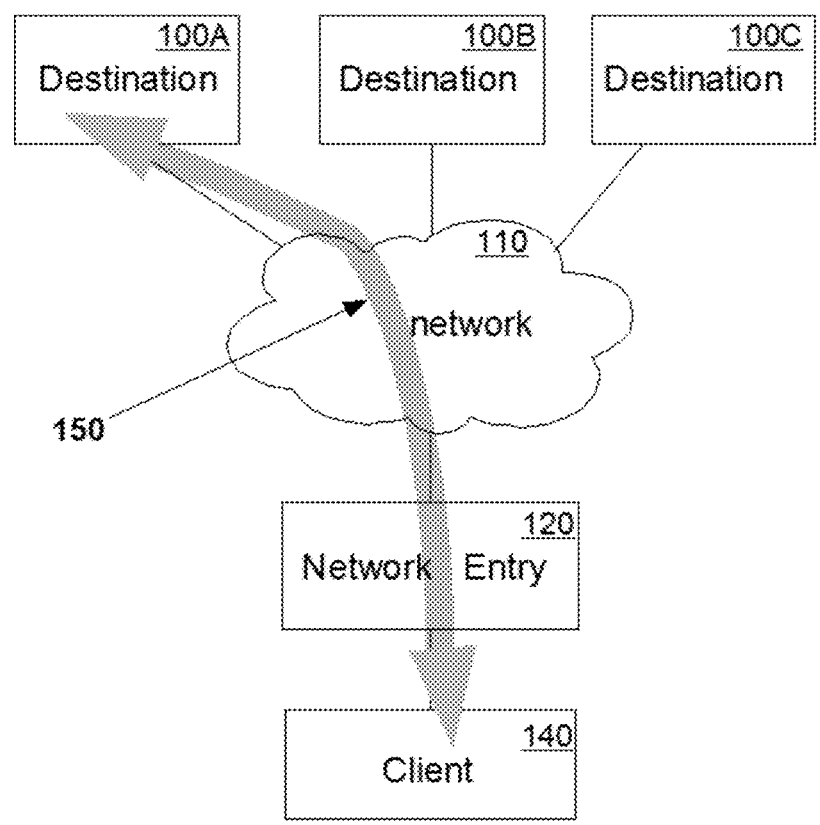
FIG. 2 is a block diagram of a network configuration illustrating a client communicating online and a communication channel highlighted.

FIG. 2 illustrates online communication elements. A client 140 may include electronic devices such as a computer, laptop, cellphone, WiFi client, bluetooth client, portable electronics device, Blackberry, iPod, iPhone, or the like. The client may include a web browser operated by a user. In determining trust, the web browser may access one or more Trusted Root Certificates (also sometimes referred to as "root certificates"). The client 140 communicates through a network entry component 120.

The network entry component 120 may be a wired or wireless component. The network entry component 120 connects the client 140 through a network 110.

The network 110 may provide electronic communication. The network 110 may be one or more of the Internet, cell phone network, wireless network, or any other electronic communication channel. The network 110 may connect to one or more destinations 100A, 100B, 100C.

A destination 100A, 100B, 100C may identify itself such as for example using secure credentials such as a server certificate, or less secure identification such as a hostname, IP address, alias, or the like.

The illustrated communication channel 150 is used to communicate between a client 140 and a destination 150 such as for example between a web browser and a website.

Figure 3:
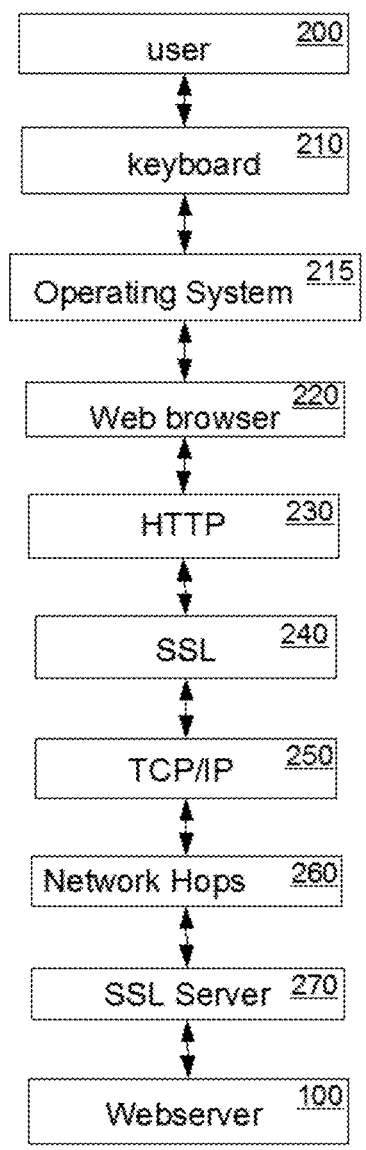
FIG. 3 is a block diagram illustrating some of the components involved in an online communication.

FIG. 3 illustrates some of the components that may be involved or have access to an online communication using web protocols to communicate between a user and a destination website. A user 200 may input data using a keyboard 210 picked up by the operating system 215 and relayed to a web browser 220 which communicates using HTTP protocol 230 over SSL 240 over TCP/IP 250 where the data packets traverse one or more network hops 260 before arriving at a destination SSL server 270 and finally the webserver 100. Each of the components may introduce some element of risk. FIG. 3 is one example of the components that may be involved in online web communications, other examples may have some of these missing or others added or ordering changed—for example, non-SSL traffic may not involve the SSL Server 270. Still other examples may use entirely different protocols or client applications.

In some embodiments, a security agent is used to determine the risks involved in online communications and/or provide guidance to online communications. A security agent may act on behalf of the user by analyzing online communication elements to assess risks and/or determine what type of online communications are acceptable. The security agent may or may not perform in a transparent manner. The security agent may act on behalf of the user. The security agent may reside locally or remotely relative to the user (e.g., at a desination) and may be considered client-side such as for example:

local desktop application of user an apparatus used by the user within an intranet, or local network network gateway, Internet Service Provider (ISP)

embedded on a portable computing device remote service (such as for example across a network such as the Internet) that interacts with destination servers In some embodiments a security agent is situated such that it has access to online communications. Some examples are:

a proxy where the client routes traffic through the proxy a networking component situated so that communications pass through it (e.g. a router, firewall, or the like)

a network component that can see, intercept, or otherwise access communications (e.g. network sniffer)

passive monitoring (such as for example a network tap, port mirror, or the like)

In some embodiments, a security agent monitors online communications. The monitoring may include examining HTTP messages.

In some embodiments, a security agent monitors online communications. Monitoring online communications may include monitoring one or more of:

user web browser application layer messages network traffic

In some embodiments, a security agent monitors HTTP communications and examines HTTP messages.

In some embodiments, a security agent monitors web browser communications and examines HTML documents.

In some embodiments, a security agent improving the security of online communications by operating outside of or external to a web browser. A security agent may operate as a web proxy with one or more web browsers configured to route online communications through the web proxy. A security agent external to a web browser may be impervious to security attacks that target web browsers.

In some embodiments, a security agent uses one or more risk decisions to assess the risks of an online communication and determines whether the risks are acceptable for a type of online communication. The online communication may include a connection to a destination web application (such as for example a TCP socket, a SSL connection, or other connection). The online communication may be specified by a user, or be automatically detected (such as monitoring communications and detecting a new connection). The online communication may for example be a connection between a client application and a destination. The risk decisions may be retrieved from a repository containing one or more risk decisions. The risk decisions may be customizable or unique for different users or enterprises. The repository may be a database. Acceptable risks may be determined by comparing acceptable parameters with the values of the online communication.

In some embodiments, a security agent uses one or more risk decisions to assess the risks of an online communication and determines what type of online communications the risks are acceptable for. The online communication may include a connection to a destination web application (such as for example a TCP socket, a SSL connection, or other connection). The online communication may be specified by a user, or be automatically detected (such as monitoring communications and detecting a new connection). The online communication may for example be a connection between a client application and a destination. The risk decisions may be retrieved from a repository containing one or more risk decisions. The risk decisions may be customizable or unique for different users or enterprises. The repository may be a database. The types of online communications may be determined by comparing categories acceptable parameters with the values of the online communication.

Various embodiments of a security agent may protect against attacks, human mistakes, human lack of understanding, or the like such as for example:
  Man-in-the-middle (MITM) SSL attacks: by recognizing differences between SSL server certificates and/or certificate chain—something non-trivial for humans to perform
  Man-in-the-Browser (MITB) attacks: by being situated or operating externally to a web browser
  Wildcard certificates: by examining the SSL certificates and/or certificate chains and using risk decisions to determine whether the communications are acceptable
  Phishing attacks: by examining the SSL certificates and/or certificate chains and using risk decisions to determine whether the communications are acceptable
  Evil Twin WiFi attacks: by assessing the networking communication elements and using risk decisions to determine whether the communications are acceptable
  Pharming attacks: by assessing the destination communication elements and using risk decisions to determine whether the communications are acceptable In some embodiments, the results of a security agent determining acceptable online communications are used to associate a sensitive data with a category or set of acceptable risks. The category or set of acceptable risks are used for future communications of the sensitive data such as for example ensuring proper release of the sensitive data. For example, a user initializes a sensitive data and instructs a security agent to perform a risk assessment of an online communication, the results of which are used for ensuring proper future communications of the sensitive data.

In some embodiments, a security agent is employed by a user to ensure sensitive data is only released over acceptable online communications. The security agent may be embedded as a web browser, web browser toolbar, web browser extension, or web proxy. When the user wishes to release sensitive data (such as for example: password, credit card data, drivers license details, social security number, or other data), the user queries the security agent for the risks of the web application. The security agent assesses the online communications details (such as the communication channel), and informs the user of the type of communications acceptable to perform using the communication details. The user uses this information to decide whether to release the sensitive data using the online communications. Optionally, the security agent then monitors online communications and detects when the sensitive data is about to be released—where the security agent then assesses the risks of the online communication and if found unacceptable—the security agent takes measures to help prevent the unintentional release of that sensitive data. The measures taken may be blocking traffic, alerting a user, or manipulating communication messages.

Figure 4:
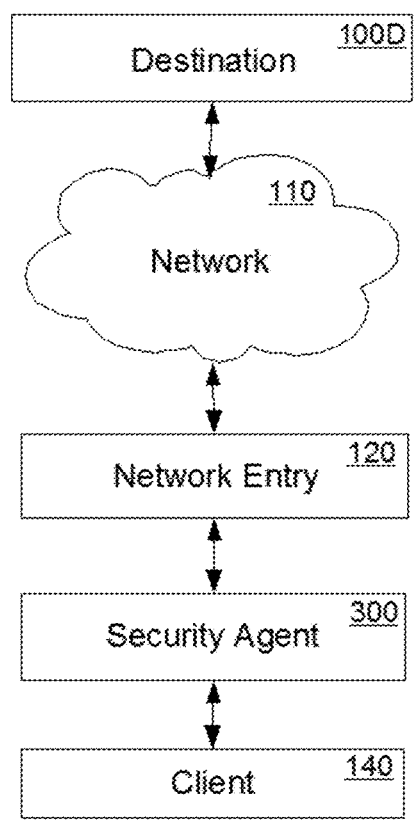
FIG. 4 is a block diagram of a network configuration illustrating a security agent involved in online communications of a client, in accordance with one embodiment.

FIG. 4 illustrates a network view of an embodiment of a security agent 300. The security agent 300 is situated such that it has access to network traffic of the Client 140, Network 110, and Destination 100D. The security agent 300 may be situated on either side of the Network Entry 120 (in this embodiment on the Client 140 side) and possibly access traffic or details of the Network Entry 120. The security agent 300 monitors online communications and performs risk assessments on the online communications.

In some embodiments a security agent assists in assessing the risks of online communications by examining risks involved in online communications. The risk assessment may be used to help make a decision one or more online communications.

In some embodiments, a security agent is queried by an entity for risk information about one or more elements/components. The security agent may be remote or local to the querying entity. For example, a web browser toolbar monitors communications and before transmitting data to a website, web application, URL, or the like—it queries a remote security agent.

Figure 5:
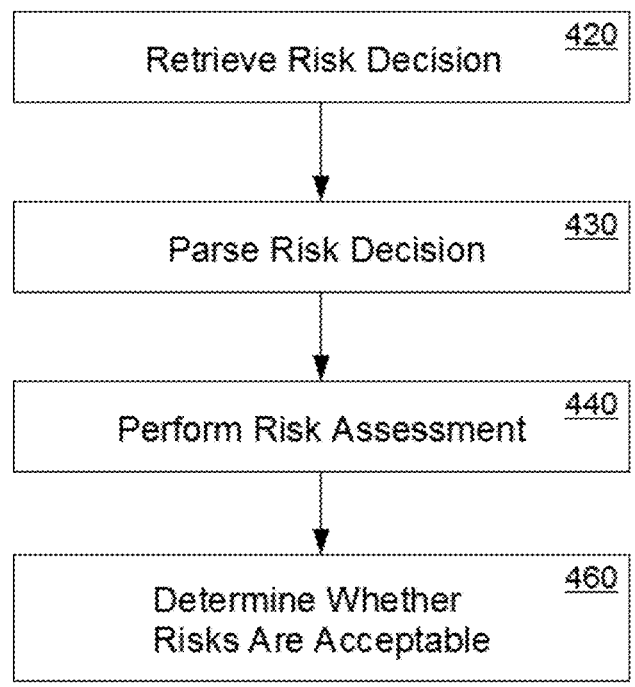
FIG. 5 is a block diagram illustrating the operations involved in determining whether the risks of an online communication are acceptable, in accordance with one embodiment.

FIG. 5 illustrates an embodiment of a security agent analyzing the risks of an online communication. Risk decisions are retrieved from a repository 420. The risk decisions are parsed to determine the communication element, and acceptable parameters 430. The risk decisions are used to perform a risk assessment of the online communication details 440. The risk assessment is analyzed and compared to acceptable risks to determine whether the risks are acceptable for: an online communication, type of online communication, or transmission of a type of data 460. In some embodiments, operation 460 is performed by a human. In some embodiments, operation 460 is performed by a security agent. Some of these operations (420, 440, 460) may be performed independently and not require one or more of the other operations. For example, operation 440 may be performed independently and results used to determine whether to proceed with the online communications. In some embodiments, some of these operations (420, 440, 460) are performed by different entities. For example, operation 440 is performed by an entity on the client, and operation 460 is performed by an entity remote from the client.

Stage 1—Risk Assessment

A security agent may perform risk assessment of online communications by examining various networking and/or client system and/or communication channel and/or destination details. Risk decisions are used to determine the risk of online communications. Components examined may include anything that may be useful for assessing online communications such as for example one or more of:
- client
- destination
- communication channel
- network A risk decision may consist of:
- communication element
- acceptable parameters Examining a client may include inspecting aspects of a client system, portable communications device, networked electronic device, or the like. Factors examined may include one or more of:
- Client security libraries being used
- Desktop security mechanisms in place (anti-virus, firewalls, etc. . . . )
- Software application (vendor, version, patch level, or the like). For example, the users web browser is examined and any vulnerabilities, exploits, or insecurities may be considered risky
- Trusted Root Certificates
- Geolocation of client
- User performing the transaction
- Network connections being created or used by a client
- Client scripting components are enabled (such as for example ActiveX, Javascript, Java applets, or the like)

Figure 5A:
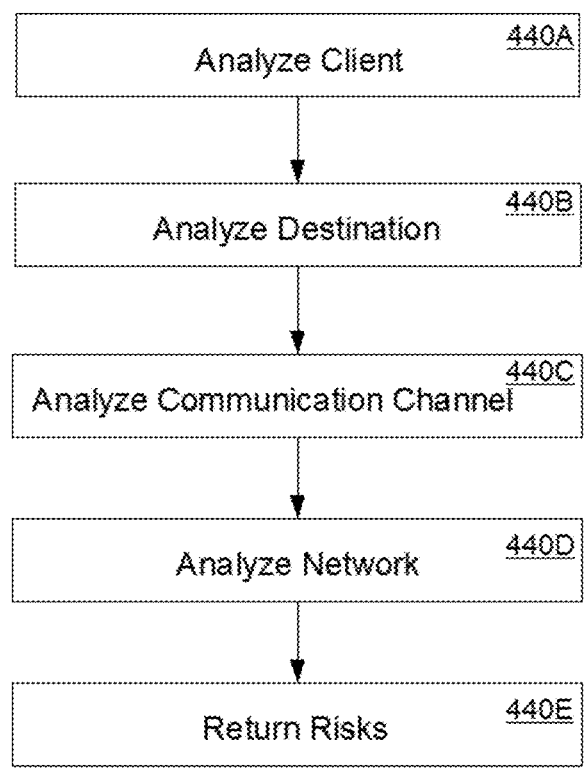
FIG. 5A is a block diagram further illustrating operation 440 of FIG. 5 with the operations involved in performing a risk assessment, in accordance with one embodiment.
Figure 5A:
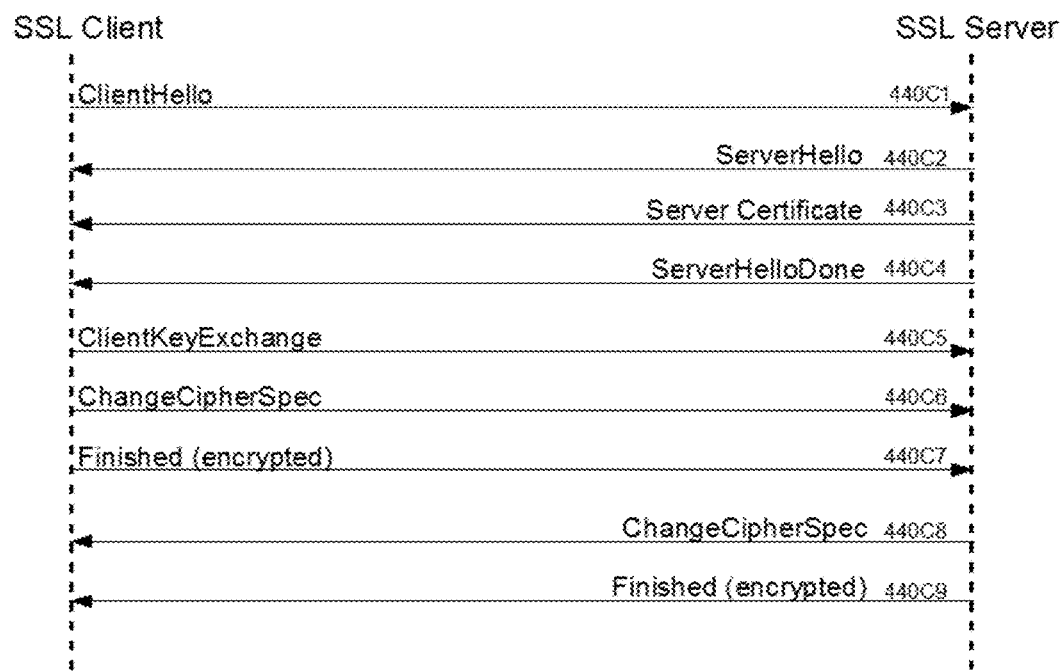

Examining a destination may include inspecting aspects of a communicating peer, service, remote site, or the like. For example:
- Web server SSL certificate
- Information from the certificate chain such as Trusted Root Certificates, Issuers, proxy certificates, or the like
- DNS hostname
- IP address
- network gateway
- hosting provider
- server software
- web server seals
- URL, URL patterns, or the like
- destinations stated or claimed handling/dealing of sensitive data such as for example contractual obligations, liability, insurance, policies, or the like
- destination is an intended recipient of sensitive data Examining a communication channel may include aspects of a communication link, session, or the like. For example:
- protocol (e.g. SSL/TLS, SSH, S/MIME)
- protocol version
- cryptographic strength (e.g. cryptographic algorithm, key size, random numbers used to generate public key pairs, or the like)
- any proxy, intermediary, or the like that may be present
- network hops, routers, or the like that data may traverse through Examining a network may include inspecting aspects of electronic communications between two or more entities. Factors examined may include one or more of:
- client network entry or access point
- client network connection
- Internet Service Provider (ISP)
- any gateway or router having access to network traffic
- any intermediaries or hops traversed
- connection settings such as TCP/IP, DNS server, or the like
- Geolocation of the network entry, access point, or the like
- Network connection protocol, cryptographic strength (none, WEP, WPA, WPA2, or the like)
- Vendor, version, or provider of the network FIG. 5A illustrates operation 440 of FIG. 5 in further detail. Client related risk decisions are analyzed 440A. Destination related risk decisions are analyzed 440B. Communication channel related risk decisions are performed 440C. Network related risk decisions are analyzed 440D. The risks determined from the previous operations are all compiled and returned 440E. Operations 440A, 440B, 440C, 440D may be performed in a different order than illustrated. One or more of operations 440A, 440B, 440C, 440D may be omitted or not performed.

Risks: Client

In some embodiments, the networks connections that a client is creating or accepting may be used as a factor in risk decisions. For example, the destinations a client connects to or accepts from may be used as a factor in a risk decision. Another example, examining processes and the protocols being used may be used as a factor in a risk decision.

In some embodiments, the Trusted Roots of a system are examined for risks. For example, web browsers, network systems (such as Microsoft ActiveDirectory), etc. . . . use a set of Trusted Root certificates as their base of trust—these Trusted Roots are examined against an external set of certificates for their respective risks.

In some embodiments, networking information provided to a client are examined for risks. For example: DNS, DHCP, network routing, or the like information is examined for whether malicious or invalid information has been provided to a client (such as DNS hijacking or spoofing).

In some embodiments, a client is examined whether it is susceptible to performing risky online communications. For example, some network devices may automatically reconnect to networks with similar identifications even though it may not be the same network (such as for example the Apple iPhone).

Risks: Destination

In some embodiments, domain information (WhoIs, Domain Registrar, registration details, or the like) are used as a factor in risk decisions. For example, some registrars may be considered more insecure, unsafe, or risky than others.

In some embodiments, multiple sources are queried to obtain information about the destination. Some examples of destination information may include IP address, WhoIs, registrar, server certificate, or the like—this data may then be compared whether they are the same and used in a risk decision.

In some embodiments, data about or from the host, hosting provider, or web site software of the destination is used to determine risk. For example, shared hosts may be considered more risky than dedicated hosts. Another example is that some hosting providers may be considered more insecure, unsafe, or risky than others.

In some embodiments, any password limitations of the destination are used as a factor in risk decisions. A more secure password a destination allows may be used as indicating less risk. For example, destinations (such as for example web servers) that do not allow special characters, numbers, or longer than a specified number of characters may be considered more risky.

In some embodiments, a destination of an online communication is examined whether it may be vulnerable or susceptible to specific types of attacks. The examination may include performing tests on the destination. Some of the types of attacks may for example include:

Cross-site scripting attacks (XSS)
Cross-site request forgery (CSRF)
Denial of Service (DoS) attacks In some embodiments, data obtained about the destination is used by a security agent in assessing the risk of an online communication. For example, DNS query results may be assessed a different acceptable risk than a DNSSEC result.

Risks: Certificates

Certificates may not all be equal and may differ in terms of risk. Certificates may contain details to distinguish their risks. A destination certificate and/or certificate chain may be used as a factor in risk decisions. In some embodiments, one or more of the following details may be used:

Assessing the amount of due diligence performed by an Issuer or Certification Authority (CA) before issuing the certificate. Due diligence may for example include validating the entity requesting the certificate.

Consulting white or black lists. The lists may be fetched from a remote or local repository. For additional safety—the lists may be pre-assessed (either manually or automatically). For example, white lists may identify certificates of businesses on the Fortune 500 list, banks, financial institutions, business bureau lists, and black lists may contain a list of suspicious or malicious certificates.

Cryptographic strength of the certificate and/or certificate chain. In some embodiments this may involve the key size, algorithms, or other cryptographic factors.

Intended usage of the certificate. This may involve factors such as:

KeyUsage bits. In some embodiments specific keyUsage bits are used to determine what type of transactions and/or what types of sensitive data are acceptable ExtendedKeyUsage extension (also sometimes referred to as Enhanced Key Usage). In some embodiments the ExtendedKeyUsage is used to determine what type of transactions and/or what types of sensitive data are acceptable.

Age of public key and/or age of certificate. For example, in a re-certification or a key update the same public key may be re-used and be more vulnerable to a brute force cracking over a longer period of time than a newer or never used before key.

Validity period. Using a certificate out of it's validity period may bear some risks.

Age. The age of a certificate or public key age may be used as a factor in risk decisions. In some embodiments a more recently issued certificate may be more risky than a certificate that has been in use for a longer period of time. In some embodiments a certificate older than a specified period of time may be considered more risky in that more time has elapsed to brute force crack the public key.

Public Key itself. In some embodiments white and/or black lists may be consulted whether the public key is listed. The white or black lists may be locally or remotely located.

Private Key Usage Period. In some embodiments the PrivateKeyUsagePeriod may be used as a factor in risk decisions.

Certificate Policy Statement (CPS). In some embodiments certificate policies specified in a certificate and/or certificate chain are used as a factor in risk decisions. In some embodiments a set of certificate policies are pre-assessed and assigned a risk level which is used when examining the certificate.

Before issuing a certificate a Certification Authority (CA) may perform some amount of vetting of the recipient of the certificate. Certificates may vary in the amount of due diligence or vetting of the requesting entity performed before the certificate was issued. Knowing the amount of due diligence performed may be useful in making a decision of how trustworthy communicating with the holder of the certificate may be. In some embodiments this amount of due diligence may be used as a factor in risk decisions. The due diligence information may be gathered by a user or entity such as a security agent. The due diligence information may be used by a user or entity such as a security agent to influence a communications decision. Certificates and/or certificate chains are examined to determine the amount of due-diligence performed by a Certification Authority (CA) before issuing a certificate. For example, one or more of (or a combination of) the following may be examined and used to assess communication risks using a certificate and/or certificate chain:

Presence or absence of specific Object Identifiers (OID's)
Certificate Policy Statements (CPS)
AuthorityKeyIdentifier (AKI)
Issuer extension
Validity period
Serial Number
AuthorityInformationAccess (AIA)
Other certificates in a certificate chain In some embodiments, increased amounts of due diligence performed by a CA in identifying and vetting the business before issuing the certificate is considered less risky and/or the more trusted the destination is who it says it is. For example, a destination that securely authenticates itself using an EV certificate may be considered less risky since an entity has been vetted through some form of official means. In some embodiments, some non-EV certificates may be considered as trustworthy as some EV certificates.

Some CA's may issue multiple types of certificates and perform varying levels of due diligence for each certificate type. In some embodiments, the amount of due diligence performed for each certificate type may be pre-assessed to reduce live computation costs.

In some embodiments, the amount of due diligence may be pre-assessed and stored in a repository. For example, once a CA and/or certificate type are identified, an associated risk level may be retrieved from a repository. A repository may be queried based on details of the certificate or certificate chain.

In some embodiments, certificates and/or certificate chains are pre-assessed and their risk levels are stored in a repository. In determining whether to proceed with online communications—a destination certificate and/or certificate chain is used to query the repository for the corresponding risks.

Risks: Communication Channel

The communication channel may be initiated by a client, on behalf of a client, or otherwise client-side. For example: online communications between a user and a remote destination.

In some embodiments, banking operations (such as releasing banking account numbers, login credentials, or the like) or other financial transactions may require greater security afford by some protocols, versions, or configurations. In some embodiments, SSL version 3 (SSLv3) or TLS version 1 (TLSv1) may be a minimum protocol requirement for any online financial communications. In some embodiments, 1024-bit may be a minimum public key size requirement for any online financial communications.

Risks: Network

In some embodiments the following network details may used as a factor in risk decisions:
  Network hops traversed. For example, the hops traversed are checked whether they appear on any white and/or black lists
  Geolocation of any communication factor being used For example, the geolocation of one or more of the client, destination, network entry are checked whether the coordinates appear on any white and/or black lists
  Previous usage history of one or more of the communication factors. For example, previous usage of one or more of the client, destination, network, communication channel are checked whether there were any reports or indications of proper or improper incidents. Another example, the previous usage of one or more of the communication factors may be examined for how long or how much it has been used with and without incidents reported or indicaticated.
  Controlled destinations—connect to a known or controlled destination and examine various communication elements. For example, connect to a website and examine the servers SSL certificate and/or public key pair, any network hops or routes taken, IP address from DNS query. Another example, connect to a users banking website and examine the client, network, banking website, communication channel and compare whether they are what is expected.

The geolocation of one or more of a network, client, or destination may be used in risk decisions. In some embodiments, there may be a mapping of geolocations (or range of geolocations) to risk(s) and/or how safe or unsafe communications may be. Alternatively, the lists may be organized into white lists and/or black lists. The lists may be periodically updated. In some embodiments a security agent steps may:
  Determine current geolocation of one or more communication elements
  Retrieve list(s) from a repository
  Lookup the risks of current geolocation from the lists
  Determine risks In some embodiments periodic examination or monitoring of one or more network connections, destinations, clients, communication channels are performed to ensure the latest up-to-date risk information is always available. One or more of the network connection, destination, client, communication channel are checked against the latest data breaches, vulnerabilities, exploits, or the like. This checking may be done periodically, or may be done in a monitoring process. Local or remote repositories may be used by the checking process. Some examples of determining whether to proceed with or allow certain online communications:
  when a user communicates online by connecting to a network, the geolocation of the client and/or network connection is determined, and the latest risk information is queried for the risks.
  when a user visits a destination, the latest risk information is queried for the risks of the destination.

In some embodiments, a security agent makes use of temporal factors in assessing the risks of online communications. The risk decisions may change or evolve over time. Acceptable parameters may change or evolve over time. The risk decisions may depend on third party information that evolve or change over time. How a risk decision is evaluated may change over time. For example, a security agent consults a third party system (such as a threat level, alert level, advisory system, or the like) and uses this to provide online communications guidance for one or more users.

In some embodiments, a security agent provides guidance to a user or web browser by determining the category or security zone of an online communication (such as for example a destination). The security agent may use a special set of risk decisions to help determine this. For example, a security agent assesses the risk of a destination, determines appropriate online communications, and places the destination in an appropriate Microsoft® Internet Explorer security zone.

FIG. 5AA illustrates one example of gathering information about the communication channel of operation 440C of FIG. 5A in further detail. The SSL client sends a ClientHello request to the server 440C1. The SSL server responds with a ServerHello message 440C2 followed by a Certificate message containing the servers SSL certificate 440C3 followed by a ServerHelloDone message 440C4. The SSL client may optionally respond with a ClientKeyExchange message 440C5 followed by a ChangeCipherSpec 440C6 followed by a Finished message 440C7. The server responds with a ChangeCipherSpec 440C8 and a Finished message 440C9. Once authentication is successful and the client obtains the server SSL certificate provided in operation 440C3 the certificate contents may be one of the items used by a security agent to assess the risks of the online communication as further discussed herein, e.g., with reference to the other figures.

In some embodiments, a security agent is embedded within a client application such that the security agent has access to the SSL servers certificate.

In some embodiments, a security agent is able to gain access to the SSL communications by inserting itself as a man-in-the-middle component. Such a security agent may provide to one or more clients its own SSL server certificates that mimic or appear to be the destination server. SSL server certificates may be signed by an issuer that appears in the clients set of trusted CA certificates (such as for example, the issuer is inserted into the Trusted Root certificate store).

Figure 6:
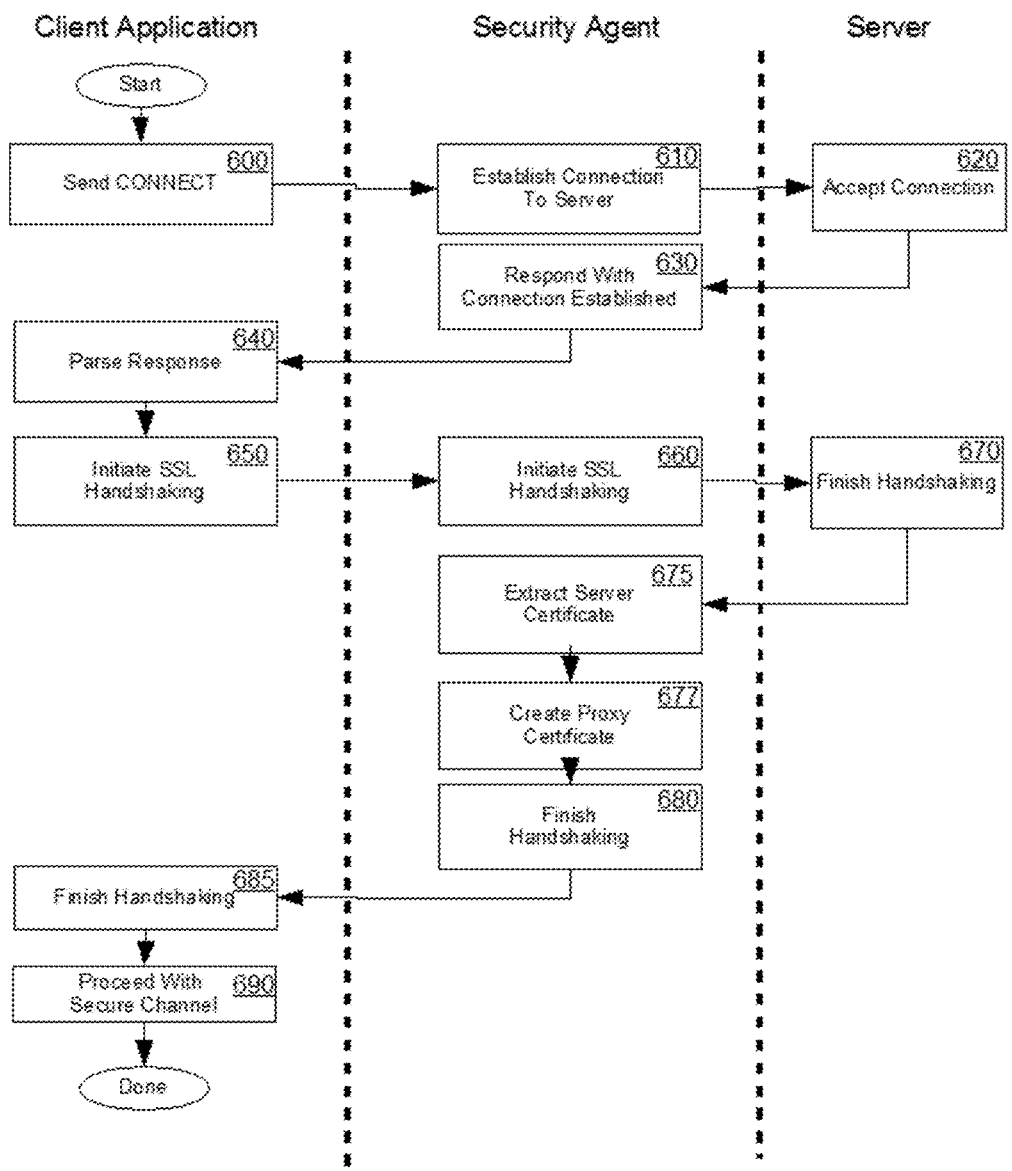
FIG. 6 is a flowchart diagram illustrating a security agent establishing secure communication channels between the client application and the destination server, in accordance with one embodiment.

FIG. 6 is an illustration of an embodiment of a method for a security agent to access traffic between a client application (such as for example a web browser) and a destination server. The security agent may or may not perform this proxying in a transparent manner to a user. The security agent may be able to proxy multiple destination servers. The security agent may proxy SSL traffic between one or more clients. The client application sends an HTTP CONNECT 600 to its configured proxy. The security agent receives this HTTP CONNECT and proceeds to establish a connection to the server 610. The server accepts the connection 620 at which point the security agent responds to the client application with an HTTP connection established message 630. In some embodiments operations 610 and 620 can be performed at a later operation or not at all. The client application receives the response and parses it 640 upon which detecting connection established it proceeds to initiate SSL handshaking 650. The security agent receives the request for SSL handshaking 660 and proceeds to initiate its own SSL handshaking with the destination 660. The destination server receives the SSL handshaking and communicates the various messages with the security agent 670 (see FIG. 5AA for details on SSL handshaking messages). After the completion of SSL handshaking with the destination server, the security agent extracts the servers certificate 675 and proceeds to create its own certificate possibly using some of the details of the servers certificate 677. The certificate that the security agent creates may be signed with a trusted root certificate the client application has in its set of trusted CA certificates (such as for example the Trusted Root certificate store) which the security agent may have been involved in creating and inserting into the trusted CA certificates. After the proxy certificate has been created 677 the security agent finishes the SSL handshaking with the client application using the previously created security agent credentials 680 which the client application accepts 685. The client application may now proceed with the secure channel just created 690.

In some embodiments, the risk assessment of online communications may trigger a blockage or warning to a user. For example, a risk assessment indicates an online communication is risky and so warns a user and/or blocks the user from communicating using one or more elements of the online communication.

A web application may include one or more of the following:
website
online application
web service
application running on an application server
web proxy
URL
web page
domain
or any other online service, product, or application
A user may include one or more of the following:
a person that uses one or more security agents
a person of a system that employs one or more security agents
an administrator of a security agent
an administrator of a network
an administrator of a system
other human.
An enterprise may include one or more of the following:
business
corporation
organization (schools, churches, charities, etc. . . . )
one or more users
financial institution
place of employment
one or more offices
one or more branch offices
government department or agency
network access service providers such as for example Internet Service Providers (ISP's), hotels, airports, Internet cafes, wifi hotspots, conference rooms, or the like In some embodiments, a security agent monitors communications of one or more networks, end points, organizations, users, or other entities. Examples of monitoring communications may include one or more of the following:

man-in-the-middling
proxying
inline network traffic
actively sniffing
promisciously sniffing
passively sniffing
examining log or audit records
within a client application or server application
or other monitoring FIG. 7 illustrates a sampling of the risk decisions available to one embodiment of a security agent. The "Communication Element" column details which online communication element (client, destination, communication channel, network) the risk decision applies to. The "Risk Decision" column details the risk decision used. The risk decisions are shown in pseudo-code form.

Risks Display

In some embodiments, the results of the risk assessment is provided to a user to determine, influence, or guide their online communications. In some embodiments the results of the risk assessment may be used by a security agent to determine whether to proceed with online communications.

The risk assessment may be presented in the form of a list, dashboard, simple yes/no, overall risk score, scale, or other display mechanism.

Some examples of where the risks may be displayed or communicated to a user include:
application toolbar. For example a web browser toolbar.
application chrome. For example a web browser chrome.
system tray or menu. For example Microsoft Windows® System Tray.
content. Some examples are: a web page dedicated to showing risks, within or nearby an HTML Form, inserted into other online content such as a web page containing communications with a destination.
popup dialog or menu item.

The risk assessment may be displayed independently, or in conjunction with other information such as web URL, certificate, network connection, signal strength, domain information, or other information.

In some embodiments, network traffic is monitored and actions are taken to perform risk assessment and/or help to ensure acceptable online communications. In some embodiments, a user may query a security agent for the risks of a network, communication channel, client, or destination.

In some embodiments, a security agent may modify or manipulate data to lessen a risk. For example, potentially dangerous javascript is stripped away from some web pages to reduce risks.

In some embodiments, a service or data source may be consulted by one or more risk decisions. Such a service or data source may be remotely located from the user or client. Some risk decisions or data used by risk decisions may be pre-assessed and results stored in a repository. Some pre-assessed risk decisions may be performed by humans.

Risk assessment may be performed before, during, or after online communications. Some example of when risk assessments may be performed are:
during first time initialization of sensitive data
when a new online communication is setup, created, or accepted
when a new network connection is made
in an ongoing or continuous manner
when a user is redirected to a new URL, website, or the like
before content is displayed (e.g. after retrieved, assembled, and assessed)
before sensitive data is released or transmitted In various embodiments a security agent may determine and/or display one or more risks and/or acceptable communications when:
- Connecting to a network. For example: when a new WiFi network is connected to.
- Constantly updating an indicator. For example: a background process or thread monitoring online communications.
- Online communications match a pattern. For example: detecting of the transmitting of a sensitive data or sensitive data type.
- A user queries as to the risks of an online communication. For example: user queries the risks of communicating with a destination, over a communication channel, using a client to communicate, or using a network connection.
- A user hovers over a link.

The risks may be determined using one or more of the following mechanisms:
- one or more rules are used to process online communication risks
- one or more factors to check whether thresholds are exceeded
- one or more policies contain information to indicate risk decisions
- access control list which contains factors that specify allowable risks
- mappings of factors with their related risk
- chained filters to analyze different components of the online communications
- factors are examined using a decision tree to arrive at a determination of risks In some embodiments thresholds are used in the risk assessment to help determine the level of risk or whether a breach has occurred.

In some embodiments, a risk decision consists of one or more thresholds. For example, a risk decision consists of a minimum and maximum thresholds.

In some embodiments, an acceptable risk consists of parameters that define thresholds of one or more risk decisions.

In some embodiments, the highest risk determines the overall risk of the online communication. The highest risk is assumed to be the weakest link and therefore affects the overall risk. For example, the entire certificate chain of a communication channel is assessed and assigned a risk commensurate with the riskiest certificate in the certificate chain (such as a CA, subordinate CA, or user certificate).

In some embodiments, the greatest risk is used to determine the level of risk.

In some embodiments, the differential between the number of positive risks and negative risks is used to determine the level of risk.

In some embodiments, a percentage using positive risks and negative risks is used to determine the level of risk.

In some embodiments, weighted risks are used to calculate a risk level.

In some embodiments, the risks and/or related data may be implemented as a list, set, array, tree, map, hashmap, vector, or any other data type that may hold data.

In some embodiments the risks are configurable thus providing flexibility in adapting to different environments in addition to being relatively easily changed over time (for example to prevent new attacks as they are diagnosed).

In some embodiments temporal events may influence risk. For example: detecting a pattern of a sudden influx of traffic to a destination or over a network route or over a communication channel may indicate that further investigation should be pursued. Another example: a server software has been determined as more vulnerable or risky than another server software and so any encounter with that server software may be detected and trigger appropriate action to be taken.

In some embodiments, the determined risks may be used to classify or organize an online communication. For example, these classifications may be used to determine the risks of an online communication.

In some embodiments, data from third party tools, indicators, or rating systems are used as factors by risk decisions. Some examples may include:
- Internet threat level
- Google PageRank
- McAfee SiteAdvisor
- NetCraft Risk Rating
- Google SafeBrowsing
- Web server seals
- or any other risk, rating, score, agency The $3^{rd}$ part tools, indicators, or rating systems may be queried for information about details such as for example: malware distribution, inappropriate content, suitable for children, phishing, proxy, or the like.

In some embodiments one or more risks are combined to contribute to an overall risk score. The risk score may be used as a simpler risk indicator rather than listing all of the risks. For example, the risk score may be a numerical score (e.g. 0 to 100), a grading (A, B, C, D, etc. . . . ), a bar, a graph, dashboard, text information, scale, or the like.

In some embodiments, statistics of online communication risks are aggregated and used in evaluating other online communications. Aggregate statistics may be gathered from other users experiences when using the same (or similar) online communications. For example, users report when they have positive or negative experiences with particular details of online communication, these reportings are aggregated and used to evaluate future online communications. For example, if a wifi hotspot is deemed as having been used by an statistically high ratio of users that later have their credit cards stolen, then this pattern may be recognized by the aggregate statistics and reflected in later risk assessments.

In some embodiments default risk decisions are provided thereby allowing users to quickly get up and running as well as not having to worry about assessing security requirement for their environment. Some examples are: online financial operations may have security requirements such as requiring specific protocols or cryptographic algorithms to be used, anti-virus installed on the client machine.

In some embodiments data is examined to assist in one or more risk decisions. The data may be located local or retrieved from a remote location. For example the data may consist of: known vulnerabilities, websites serving known vulnerabilities, credentials considered safe, credentials considered suspicious, patterns that are safe or risky, or any other data used to evaluate risk or assist in making a risk decision.

The risk decisions listed herein are a sampling that may be useful in determining the risks of online communications. Essentially any factor that may help evaluate the security of communicating online may be used in determining risk.

In some embodiments security tools may be used to analyze the risks of online communications. For example, penetration testing tools such as the MetaSploit framework may be used to analyze the risks of an online communication.

Stage 2—Acceptable Risks

Online communications may vary depending on their purpose or intent and may have their own acceptable risks, risk levels, or thresholds. Some communications may require more security or safeguards than others. For example: financial transactions may require greater security than non-financial and so may need enhanced scrutiny.

The risks determined from the risk assessment may help determine whether or what type of online communications should proceed. The risks may be provided to a user or another component to decide whether the risks are acceptable for an online communication.

In some embodiments the risks provided are compared against a set of acceptable risks and used to help determine what type of sensitive data or transaction types are acceptable for communicating online. Such factors may influence whether further communications should be stopped/blocked or whether a sensitive data, data type, transaction, or transaction type should be allowed to be released.

In some embodiments the risks provided are compared against a set of acceptable risks and used to help determine which online communications are acceptable. This may include whether a specific sensitive data, or sensitive data type may be released. Or this may include whether a transaction or transaction type is acceptable for the online communications.

The risk assessment may help ensure sensitive data is released only to appropriate or acceptable destinations, or destination types.

Figure 5B:
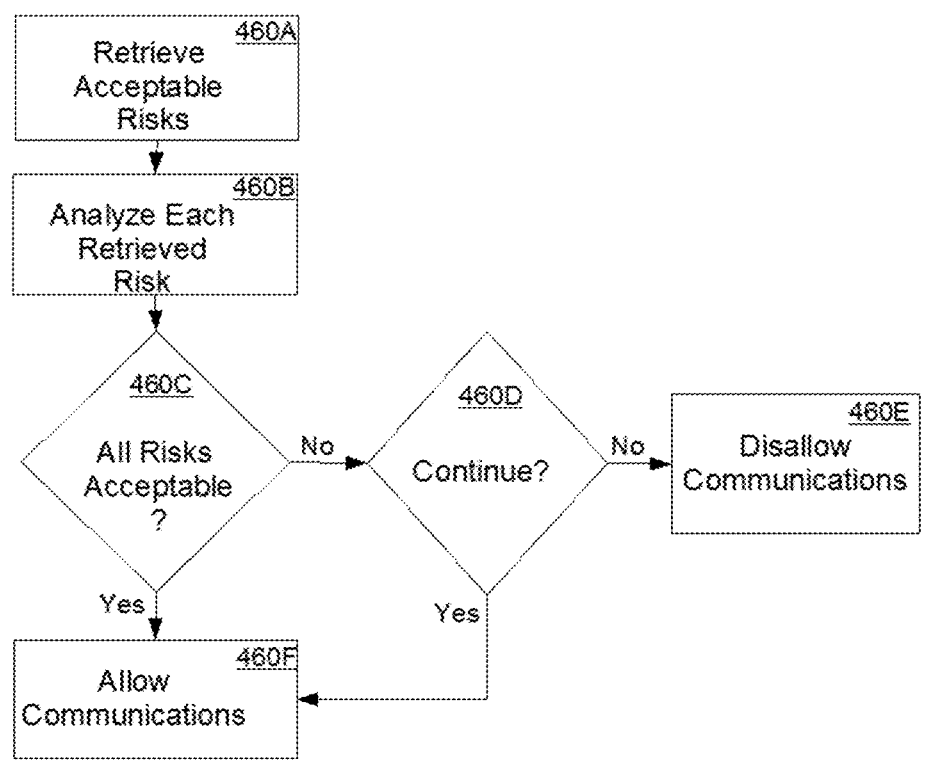
FIG. 5B is a flowchart diagram further illustrating operation 460 of FIG. 5 with the operations involved in determining whether the risks are acceptable, in accordance with one embodiment.

FIG. 5B illustrates one embodiment of operation 460 of FIG. 5 in further detail. Acceptable risk decisions are retrieved from the repository in operation 460A. The online communication is examined whether each retrieved risk decision poses a risk 460B. An analysis is made to determine whether all risks were acceptable 460C and if not then actions are taken to determine whether to continue anyways (for example: query a user, examine other details, or the like) 460D. If at operation 460D it is determined not to continue then proceeding with the online communications is halted 460E. If at operation 460D the user decides to continue or at operation 460C all risks passed then the online communications may proceed.

In some embodiments, risk decisions are retrieved and used to analyze the risks of online communications. The analysis may then be used to evaluate whether to proceed with online communications.

In some embodiments two or more risk decisions are combined to better evaluate whether the online communications should proceed. For example:

The cryptographic strength is otherwise unacceptable but the geolocation of the client indicates its location is inside the range of a Fortune 500 office and therefore communications may still be acceptable An organizations intranet web server appears to be the destination but only the HTTP protocol is being used but the WiFi access point being used is controlled by the organization so communications may be acceptable The destination is unrecognized (e.g. has not been seen before) and so would otherwise be unacceptable but the web server seals verify and so the destination is deemed ok Traffic is being routed through a proxy server which would otherwise be unacceptable but the SSL certificate is recognized and valid The same password is being used across two different websites which would otherwise be unacceptable but both sites either have the same owner, the type of data to be released to the destination(s) is not sensitive The destination certificate has expired or is time invalid, also the Internet threat level is at a raised or alert level—so further online communications are not recommended or even blocked Type of data to be released is sensitive, also third party service indicates some risk—so further online communications are not recommended or even blocked The amount of due diligence performed by a CA before issuing a certificate may be pre-assessed by a security agent (such as for example to improve performance during live processing). Certificates may be classified or organized according to their assessed risks or types. For example, some certificates may be deemed as worthy for online banking, some worthy for as personal email, and some known to be fraudulent.

FIG. 8 illustrates an example of one embodiment of a security agent with rules that are used to determine acceptable risks for various online communications. The Category column specifies the type of online communication, and the Risk Decisions column specifies one or more rules used to determine whether the online communications meets the requirements for the category. In this example, the risk decisions are shown in C-like pseudo-code snippet form. In this example, each row contains the Risk Decisions for the specified Category. In this example a Category may use rules provided in its Risk Decisions column in addition to Risk Decisions from one or more lessor Categories. In this example, "Cert" refers to the SSL certificate of the communication channel, "NetConnWhitelist" refers to allowed network connections, "DestinationWhiteList" refers to the allowed destinations, "IssuerBlacklist" refers to allowed Issuer certificates, "DestinationBlackList" refers to a list of disallowed destinations, "ListOfPrescreenedBanks" refers to allowed banks, etc. . . . . . This example uses a variety of functions to help in assessing the risk—isPresent( ) refers to determining whether the first parameter is found in the list specified in the second parameter. The notPresent( ) function refers to determining whether the first parameter is not found in the list specified in the second parameter. The "==" operator refers to the C equals comparison operator. An example of a risk decision is the "Cert.Type==ExtendedValidationCertificateType" risk decision which compares the determined certificate type of the SSL server certificate used in the communication channel ("Cert") where the certificate type is found by examining the certifcate and detecting certificate extensions which indicate an Extended Validation Certificates (EV). Another example of a risk decision is the "isPresent(Cert, ListOfPrescreenedBanks)" risk decision which determines whether the certificate of the SSL server used in the communication channel ("Cert") is found in a list of banking certificates that have been pre-assessed.

FIG. 9 illustrates an example of one embodiment of a security agent with risk decisions defined with communication elements, communication sub-elements, and acceptable parameters. Communication sub-elements are used to refine the communication element. For example, the certificate type of the data destination (Destination, Cert.Type) is examined to determine whether it is an ExtendedValidationCertificateType—if is not then it is considered a risk.

In some embodiments, a user and/or enterprise may specify one or more risk decisions for a sensitive data or data type—when releasing that sensitive data or data of that data type, a security agent may help to ensure risks are not present.

In some embodiments, the risk decisions and/or acceptable parameters of a security agent are modifiable. Such embodiments, provide entities (such as for example users, enterprises) the ability to customize the operability of a security agent.

In some embodiments, a security agent is operated by an end-user.

In some embodiments, a security agent is operated by an enterprise.

In some embodiments, sensitive data is set to adhere to the risk decisions for a category. A security agent helps to ensure that sensitive data is only communicated using online communications that pass the risk decisions for the category.

In some embodiments, sensitive data or operation types are categorized. Each category may have defined one or more risk decisions that act as the requirements for the category. A security agent may ensure the communication of sensitive data and/or operation types meet the requirements for their category.

In some embodiments, one or more risk decisions are defined for a data type. Patterns may be used to identify data types and so the appropriate risk decisions may be automatically determined. For example, some credit card numbers have specific prefixes and/or specific lengths—these patterns may be detected and the online communications are checked to ensure they meet the requirements for the credit cards.

In some embodiments, a security agent determines one or more categories that are acceptable for an online communication.

In some embodiments, sensitive data is associated with acceptable risks to assess whether the sensitive data should be released.

In some embodiments, sensitive data is associated with an online communication category to assess whether the sensitive data should be released.

In some embodiments, sensitive data may be bound to or associated with elements of an online communication. For example: credit card information may be associated with a specific protocol, minimum cryptographic key size, destination identifier, network, or other communication details.

In some embodiments, one or more online communication risks may be associated with sensitive data to ensure future communications meet security requirements for the sensitive data. For example, a security agent assesses the risk of an online communication details and a user decides future communication of a sensitive data should be automatically allowed for online communications with similar or matching risks—this may reduce the need for a user to perform similar decisions in the future. Another example, is sensitive data is associated with acceptable risks for a sensitive data and this association is stored in a repository to be used by a security agent in the future to determine whether online communications should proceed for the sensitive data.

In some embodiments, a security agent detects sensitive data being released over an online communication and detects the risks of the online communication and ensures future communication of the sensitive data is performed using similar or related online communications. For example, a user enters credit card details over an online communication, a security agent determines the risk levels, associates the risks to the sensitive data, monitors future communications and ensures the sensitive data is released over similar or related online communication risks.

In some embodiments, a step of associating sensitive data with online communications may be restricted to being performed out-of-band. Examples of out-of-band communications may include: by phone, physical access to something, in person, direct communication using a specific workstation or computer. Such an embodiment may be more secure since:

securing a centralized security agent may be better secured more trust may be placed in a centrally controlled security agent a remote attacker may not as easily associate sensitive data with online communication risks human intervention may authenticate the person before performing the association In some embodiments, a risk assessment includes checking executable code is downloaded only under certain conditions.

In some embodiments, risks may used to throttle bandwidth. For example, if a destination website contains non-business items (such as games, movies, etc. . . . ) then traffic of such items are throttled down in order to give other traffic higher priority or quality of service.

In some embodiments, a user may query a security agent to analyze the risks of an online communication and/or the acceptable categories of an online communication. A user may specify a destination, URL, alias, or other identifying characteristics of an online communication that a security agent performs a risk assessment on and/or determines which acceptable categories the online communication meets the requirements of. The user or the security agent may then decide whether to proceed with online communications.

In some embodiments, a user may provide an alias, name, category, or type to specify one or more risk decisions to use in a risk assessment. For example, a user may indicate that they intend to perform personal financial operations, then a set of risk decisions are used to ensure the online communications are sufficient for personal financial operations.

In some embodiments, the user may specify a mode that defines acceptable risks for online communications. For example, a user may switch to an online banking mode which triggers a security agent to use the risks associated with a corresponding category (e.g. "online banking") and ensure future online communications all meet the requirements for. Another example is a user specifies a lockdown mode which a security agent then ensures no sensitive data or operations are performed.

In one embodiment, an overall risk score is calculated and then compared with acceptable risk scores for categories to arrive at a conclusion for appropriate types of communications or whether to proceed with an online communication.

Figure 10:
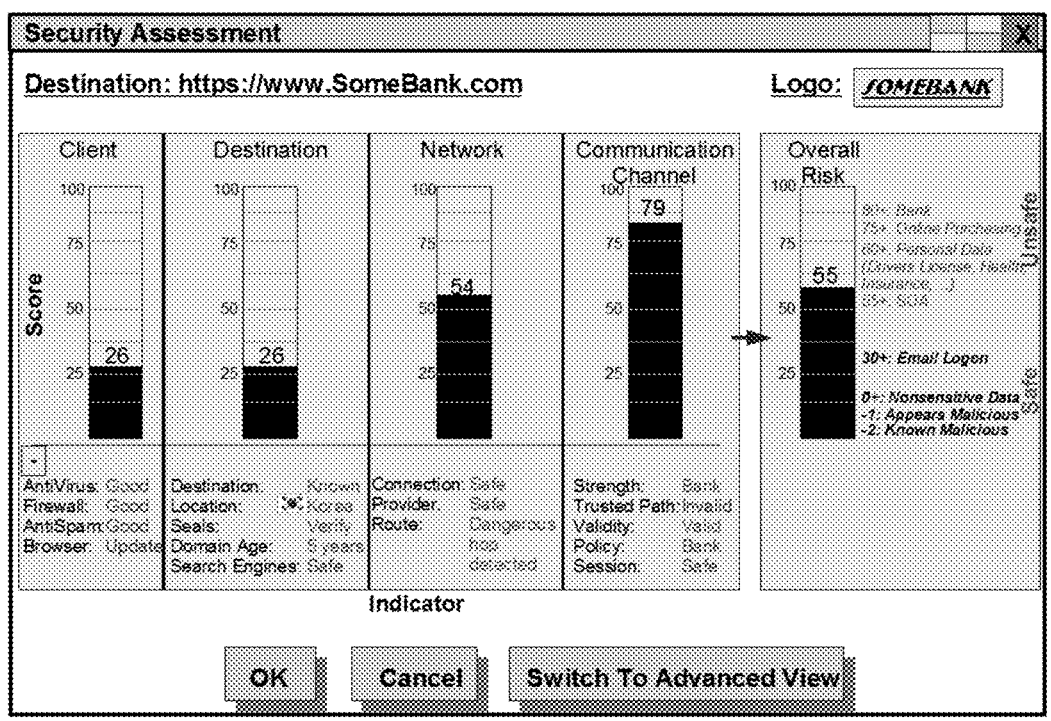
FIG. 10 is an example of a dashboard screen illustrating the results of a security assessment, in accordance with one embodiment.

FIG. 10 illustrates one embodiment of a display of the results of a risk assessment. The risks of an online communication have been assessed and compiled into a dashboard display. This dashboard illustrates both the risks and acceptable online communication types. The lower section provides an overview of the risks, the upper section provides an overall rating for the communication element (e.g. Client, Destination, Network, Communication Channel). The right hand side provides an overall risk rating score.

FIG. 11, FIG. 12, FIG. 13, and FIG. 14 illustrate one embodiment of a security agent where risk decisions with acceptable parameters are used to assist in improving the security of online communications. For simplification purposes, this embodiment focuses on the communication channel, and specifically a SSL communication channel. Also, for simplication purposes, this embodiment uses some pre-assessed information, but this data could also be assessed or determined live or during runtime.

FIG. 11 illustrates an example of a database table containing acceptable parameters for risk decisions for 4 categories ("OnlineBanking", "OnlineShopping", "B2B" aka Business-to-Business, "Webmail"). Each row represents the acceptable parameters for one Category. The "Min CA Risk Rating" column details the minimum acceptable parameter for the risk rating (in numeric form) of all issuers in the certificate chain for the SSL server certificate. The "Min Cert Type" column details the minimum acceptable certificate type of the SSL server certificate (e.g. EV certificates, DV certificates, NULL or no certificates, etc. . . . ). The "Min CPS Rating" column details minimum acceptable rating (in numeric form) for the Certificate Policy Statements (CPS) of the SSL server certificate. The "Min Seen Since" column details minimum acceptable parameters for the number of days the SSL server certificate have been seen or known to be in use without incidents reported. The acceptable parameters may be provided as default settings with the security agent. The acceptable parameters may be modified, added, or deleted by users of the security agent.

FIG. 12 illustrates an example of a database table containing pre-assessed risk ratings for 4 CA certificates ("CA1", "CA1", "CA2", "CA3"). In this example, one CA ("CA1") actually has 2 certificates that have been pre-assessed. Each row represents one CA certificate. The "CA" column identifies or names the CA. The "Certificate" column details the actual certificate (in Base64 encoded format). The "Risk Rating" column specifies the risk rating (in numeric form). The pre-assessment may take into account details such as the amount of due diligence a CA performed when validating the entity requesting a certificate. The pre-assessment of CA certificates may be cached or stored for later use and performance benefits. The pre-assessment may involve automated means, or human assistance. The "Risk Rating" is used by the security agent to determine the pre-assessed rating for a CA which can be compared with the "Min CA Risk Rating" of FIG. 11.

FIG. 13 illustrates an example of a database table containing pre-assed risk ratings for 4 Certificate Policy Statements ("CA1", "CA2", "CA2", "CA3"). Each row represents one CPS. The "CA" column identifies or names the CA. The "CPS" column details the Certificate Policy Statement (in Base64 encoded format). The "CPS Rating" column specifies the risk rating (in numeric form). The pre-assessment may involve automated means, or human assistance. The "CPS Rating" is used by the security agent to determine the pre-assessed CPS rating for a CPS which can be compared with the "Min CPS Rating" of FIG. 11.

FIG. 14 uses C-like pseudo-code to illustrate the algorithm used to determine the risk rating. The DetermineRiskRating( ) function is used to determine a risk rating for a particular certificate (provided by the iCert input parameter). The X509_Cert structure is a simplified, rudimentary example for illustrative purposes that may contain only a portion of the details contained in an actual X.509 certificate. The "DBLookup" refers to a database query. "Cat" is for simplification purposes to help illustrate multiple values returned from the "DBLookup" to be easily accessed. The DetermineRiskRating( ) function can be used to determine whether the SSL communication channel identified by the iCert certificate is acceptable for the iCategory category. Similarly, the types of online communications that are acceptable for a given SSL communication channel could also be determined by for example iterating through all categories and determining whether each category is acceptable such as shown in DetermineAcceptableCategories( ) function.

Target

Some embodiments may target end users to help manage their personal online communications, personal data, or user security.

Some embodiments may target enterprises to help them manage their business communications, enterprise data, or enterprise security.

In some embodiments, the risk decisions are configurable thus allowing enterprises to customize the security requirements for their specific needs. Some examples:

some organizations or enterprises may desire to trust a different set of Trusted Root Certificates than what the operating system or web browser defaults are. This may provide advantages such as giving the enterprise better information or control over their online communications some organizations or enterprises have specific company policies that need to be adhered to In some embodiments, a security agent provides services to one or more users. For example, a remote proxy may be configured to assess online communications for multiple users simultaneously.

In some embodiments, a security agent may identify and/or authenticate a user before providing some services.

System

Figure 15:
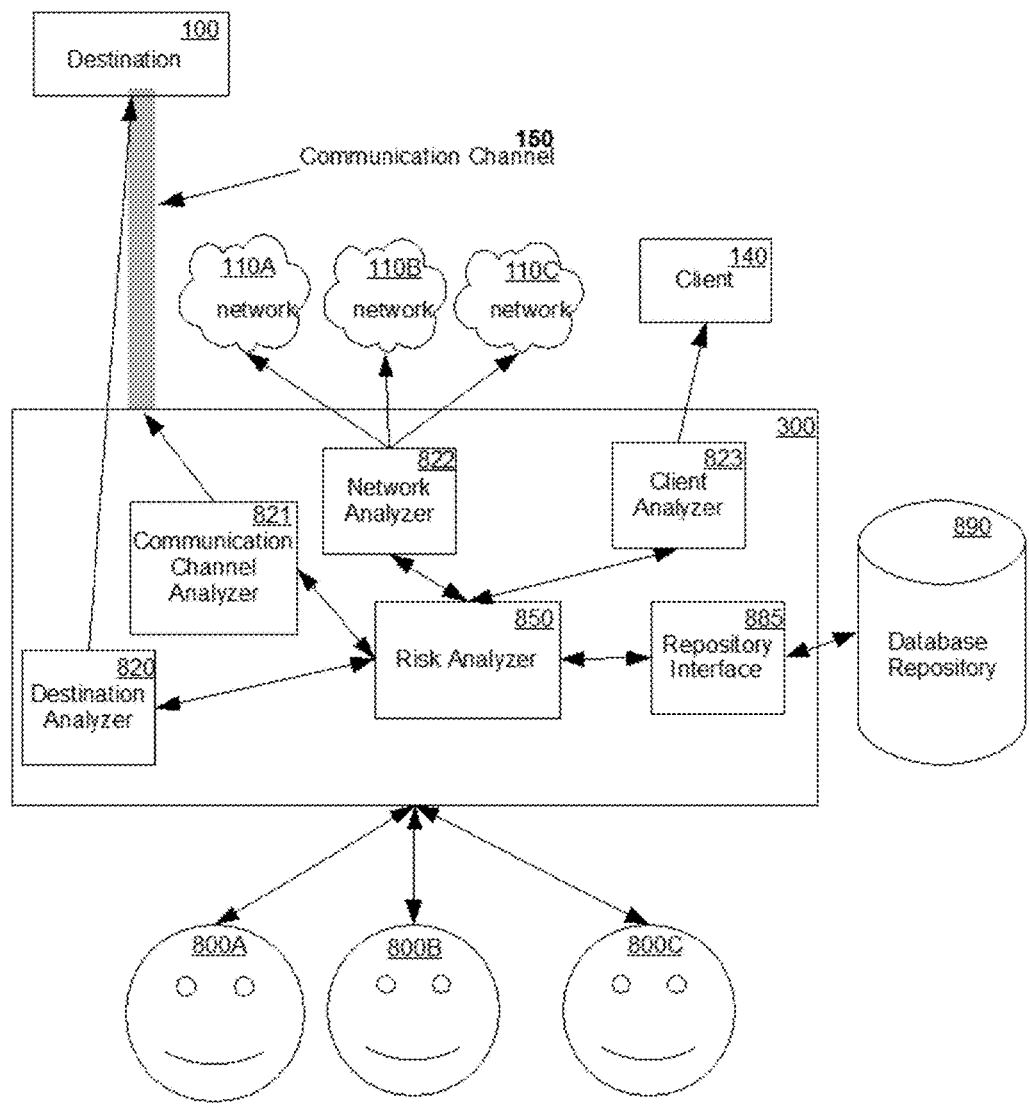
FIG. 15 illustrates details of an embodiment of components that may be utilized in a network configuration.

FIG. 15 illustrates an embodiment of a security agent system. One or more users 800A, 800B, 800C may access a security agent 300. A security agent may include a Destination Analyzer 820, a Communication Channel Analyzer 821, a Network Analyzer 822, a Client Analyzer 823 which are all controlled by a Risk Analyzer 850. The Risk Analyzer may retrieve Risk Decisions, sensitive data, or other data from a Repository 890 using a Repository Interface 885. The Repository 890 may hold various data such as for example: risks, risk decisions, sensitive data, patterns to identify sensitive data, certificates, destinations, or any other data used by a security agent. The Destination Analyzer 820 may analyze the risks of one or more Destinations 100. The Communication Channel Analyzer 821 may analyze the risks of one or more communication channels 150. The Network Analyzer 822 may analyze the risks of one or more Networks 110A, 110B, 110C. The Client Analyzer 823 may analyze the risks of one or more user Clients 140.

Applying risks decisions to online communications may provide the following advantages:

Extendable: modify risk decisions. For example, administrators for an enterprise may be able to add, update, or delete risk decisions as new attacks, exploits, vulnerabilities, or the like become known. Another example, users may be able to customize their online communications suited to their risk tolerances.

Centralized updated risks: Risk decisions may be retrieved or downloaded from a centrally controlled service. For example, as risks become known—corresponding risk decisions are created that a security agent may retrieve during a periodic update. This may free users and/or enterprise administrators from having to worry about investigating and keeping up with the latest attacks, exploits, vulnerabilities, or the like.

Flexible location: The location of the security agent with respect to the user is flexible. A security agent may be remotely or locally located to a user.

Centralized Service:

A centralized service that provides risk information may involve:
- centralized service that maintains up to date of new risks
- centralized service writes appropriate risk decision(s)
- centralized service makes risk decisions available for download (this may include acceptable risks)
- client Security Agent downloads risk decisions
- client Security Agent applies risk decisions on online communications (e.g. communications going forward)

Input Variations:

A security agent may use one or more of the following with which to look for risks:
- User specifies destination, certificate, or URL. The user may query a local or remote service for risk information. For example, a user queries a security agent for the risks of a URL, after which either the user or the security agent decides whether to proceed with online communications.
- Online communications are monitored (sniffer, proxy, router, firewall, or the like) and risks are determined on an ongoing basis. For example, a security agent monitors network traffic and determines the risks and provides to a user and/or determines whether online communications are acceptable for online communications.
- Data or user actions are intercepted and/or manipulated (web browser extension, addon, proxy, web browser, or the like). For example, a user indicates that they wish to perform an online communication which a security agent detects and checks the risks are acceptable.

Implementation Forms

A security agent may be implemented as a proxy, firewall, client-side software application, web browser, web browser extension, or the like.

A security agent may be used by computer, desktop software, cellphone, smartphone, PDA, iPod, iPhone, Blackberry, portable electronics device, hardware device, USB device, or the like.

In some embodiments, a security agent is implemented in software such as a desktop software application. In some embodiments, a security agent is in the form of an apparatus. In some embodiments, a security agent is implemented in hardware such as a smartcard, computer card, CPU. In some embodiments, a security agent resides on a removable or external device (such as for example a removable hard disk, a USB key, or the like) to provide portable, enhanced security advantages. In some embodiments, a security agent may reside on a bootable storage (such as a hard drive, Live CD, USB key, or the like) to possibly provide enhanced security knowing that the machine is in a controlled state. In some embodiments, a security agent resides on a portable device to provide roaming, or portability advantages.

In one embodiment the functionality of the security agent and/or the data repository containing one or more risk decisions may reside on a non-writable media or device. One useful scenario for such an embodiment might be accessing an online institution and the media or device is provided to the user with all data pre-installed and possibly unchangeable—thereby in some aspects improving security since the data is not easily changed. The data may include risk decisions, communication categories, repository, pre-assessed risk decisions, or the like. The non-writable media or device may be a live-CD that contains a security agent and which the user may use to boot a computer and safely communicate online. The user may carry a non-writable media or device with them to use on systems or networks that the user does not fully trust and use the security agent to improve security by performing a risk assessment and/or determine acceptable online communications. Excluding other circumstances, one or more of the advantages of such an embodiment may be:
- lessen the need for additional anti-virus or anti-spyware software
- provide portability
- allow user to safely use insecure systems
- relatively low cost (for example organizations may mail out the portable media to multiple members for relatively low cost)

In some embodiments, the security agent has access to a repository containing data used to perform risk assessments and/or determining whether online communications are acceptable. Some of the data used may for example include one or more of:
- Data used to analyze risks such as for example: risk decisions, risk rules, policies
- Data used by the risks such as for example: black lists, white lists, geolocations, Trusted Root certificates
- Data used to determine whether online communications are acceptable such as for example: categories, types, aliases
- Sensitive data, patterns of sensitive data In one embodiment the functionality of the security agent and the data repository containing the risk decisions may reside on a non-writable media or device and used in an existing operating system. For example, a read-only CD containing the security agent and the data repository may be inserted into a computer and the user is able to interact with the financial institution(s) stored within the data repository.

In one embodiment a non-writable media or device may contain code to ensure secure communications with a remote service which provides the functionality of the security agent. For example, the user has in his possession a read-only CD that contains a security application to analyze online communications before proceeding with communications. This may provide enhanced security and/or improved portability.

In some embodiments communications may be monitored and/or manipulated. In some embodiments a security agent may take the form of a network proxy (such as web, ftp, email, or other).

In some embodiments a security agent may take the form of a web browser extension, toolbar, or within the web browser itself. In some embodiments a security agent may be embedded within an operating system (such as a network driver, extensions, or other).

In some embodiments a security agent may reside within a networking component (such as network router, firewall, gateway, or the like). In some embodiments a security agent may reside within a portable networking device (such as a cellphone, smartphone, iPod, iPhone, Blackberry, PDA, bluetooth, or the like). In some embodiments a security agent may reside within an attachable device (such as a USB key, firewire device, removable storage, or the like). In some embodiments a security agent may reside within a smartcard or similar.

In some embodiments the security agent is split up into separate components with the split up components performing various tasks which together provide one or more of the functions mentioned herein. The components may or may not be remotely located from each other.

In some embodiments a service is provided that users and/or security agents may query for risk analysis. For example, a user may query a remote service that assesses the risks of an online communication elements to analyze risks which may be use to help determine whether to proceed with the online communications and/or what types of communications are acceptable.

Intrusion Detection System (IDS)/Intrusion Prevention System (IPS)

In some embodiments, a security agent detects and/or prevents deemed potentially risky or suspicious activity from happening on a network. Potentially risky or suspicious activity may include security attacks, inadequate security, tricking or manipulating an entity (such as user, client application, server, network, or other entity), or other malicious activity. The network may include a local area network (LAN), wide area network (WAN), company intranet, home network, or the like. If detected, a security agent may prevent malicious activity by:

- sending an alert (SNMP traps, emails, pages, text messages, phone calls, or the like) to one or more users or administrators
- manipulating network traffic
- filtering network traffic
- blocking network traffic
- dropping network traffic
- disconnecting connections
- spoofing TCP resets to either the source or destination systems
- take measures to identify one or more entities such as the source or destination For example, an entity that provides network connectivity (such as for example: an airport, a hotel, WiFi hotspot, library, student campus, etc. . . . ) employs a detector which monitors and assesses the risks of online communications for one or more users, and takes action to block the network traffic.

Forensics

In some embodiments, a security agent is employed for the purposes of digital forensics to assist in recognizing or determining inappropriate or risky online communications. For example, an investigator uses a security agent to analyze a network packet capture to narrow down potentially risky online communications, and possibly uses this information for the basis of further investigation.

In some embodiments, a security agent analyzes online communications from network-based evidence. The analysis may include examining or assessing application layer (or higher) traffic (such as for example SSL/TLS communications). The network-based evidence may include captured network packets, logs, network traffic details, processing live events, or other network data. The network-based evidence may consist of network events, network packet captures, or any other network data. The analysis of HTTP cookie usage may be used to help track down attacks against hosts, users, networks, or other entities. The analysis may be used to assist in recognizing or determining inappropriate or risky online communications. For example, an enterprise administrator suspects that inappropriate release of sensitive data has occurred, the administrator employs a security agent to examine and analyze one or more captured network packet files, and by examining the release of sensitive data along with the online communication details the security agent is able to assess which online communications may be a potential suspect and possibly further investigate or take remedial action.

In some embodiments, a security agent is used for the purpose of digital forensics, where the security agent examines network based evidence to analyze online communications, and points out communications that may have been inadequate or less than acceptable. The network traffic details may for example include network packet capture, logs, network traffic details, processing live events, or other network data.

Operational Modes

In some embodiments, a security agent provides means for an operator to place the security agent into one or more operational modes. The operational modes may have distinguishing characteristics that specify acceptable and/or unacceptable online communications. For example, a user may specify a mode to the security agent which indicates what type of online communications the user intends to perform for one or more requests, or over a period of time. Another example, a user might switch to a "Safe Browsing" mode at which point a specific set of checks or rules are checked before allowing release of any sensitive data. Another example, a user may indicate "Online Banking" mode which a security agent uses to ensure online communications only with an online bank occur during which the mode is active. Another example, a user specifies a "Social Networking" mode which a security agent uses to limit which types of data that are released during engagement of the mode. Another example, a users engages a "banking" mode, where a security agent examines and follows all links to ensure a minimum set of banking standards are adhered to.

In some embodiments, a set of measures are associated with one or more destinations. The measures may include rules, checks, or operations to apply to online communications. The destinations may be identified by their web site, domain name, public certificates, or public keys. The destinations may be grouped into categories of related characteristics. For example, a set of online banking institutions are identified by their SSL server certificates, a set of measures are applied to HTTP cookies originating from SSL sessions identified by those server certificates.

In some embodiments, a security agent operates in a mode to exclusively communicate with a limited set of destination servers. For example, a user may specify a "Banking" mode which a security agent uses to ensure communication only occurs with the users banking website or affiliate destination servers.

In some embodiments, a security agent provides an operational mode that provides guidance and/or ensures acceptable online browsing by preventing entities other than those specified, or of acceptable risks to trigger release of sensitive data.

In some embodiments, a security agent provides an operational mode that helps to prevent unintentional online communications by examining characteristics of the online communications. The characteristic may be any factor related to communications such as the destination, communication channel, time, client application, user, network, or any other factor. For example, a security agent monitors communications and prevents non-authorized entities to trigger release of cookies originally set over SSL where the cookies are for an online financial institution and the non-authorized entities are any web applications that are not related to the financial institution.

In some embodiments, sensitive data within a client application (such as a web browser) belonging to a category or classification are deleted by a security agent when leaving a mode, or prior to entering a mode. For example, a users switches to "online email" mode then a security agent deletes all "Banking" related cookies.

In some embodiments, detection of a communication factor automatically changes operational modes for a security agent. A communication factor may include any item within a communication session such as for example an event, inclusion of a header, exclusion of a header, or the like. An operational mode may include rules, measures, checks, or other items that help protect online communications. For example, a user clicks on a link within a social networking website which causes a security agent to treat one or more cookies (typically of another web application such as banking web applications) differently or possibly removing or deleting the cookies. Another example, when a user visits a specified website, a security agent enters into a "risky" operational mode and thereby handles one or more HTTP cookies differently.

In some embodiments, detection of an item triggers a security agent to switch into a different operational mode. The item may be an URL, domain, document, script, image, frame, iframe, etc. . . . . For example, accessing a specific URL triggers a security agent to change from a "banking" operational mode to a less secure operational mode (e.g. social networking, email, etc. . . . ).

In some embodiments, a security agent protects online communications for one or more configured web applications for an operational mode. For example, a security agent is placed in an online banking mode where a security agent ensures acceptable online communications for a list of one or more configured domains.

Automated Data Categorization

In some embodiments, a security agent monitors communications, detects data being transmitted, assesses the risks of the online communication, and categorizes the data according to those assessed risks.

In some embodiments, a security agent monitors a users online communications, the security agent detects when a user enters data into an application, and assesses one or more risk decisions to determine the risks of the online communication, from which the security agent associates the results with the data. The application may be a web browser and the the user enters data into an hyper text markup language (HTML) form. Associating the results may include categorizing the data into one of several online communication categories.

In some embodiments, a security agent is utilized by an enterprise to help categorize data by examining the risks of the communication channel and determining one or more appropriate categories to place the data in. The data may be detected by examining certain fields of a message (such as for example HTTP Post Body, HTTP Get parameters, or the like).

In some embodiments, a security agent is utilized by an enterprise to determine one or more appropriate categories, or risk levels of data by assessing online communication risks and categorizing the data. The data may be detected by examining certain fields of a message (such as for example HTTP Post Body, HTTP Get parameters, or the like).

Security Appliance

In some embodiments, a security agent is integrated with a security appliance apparatus to assist users, or enterprises with the security of their online communications. The security agent may help perform risk assessments, and or help ensure acceptable online communications.

In some embodiments, an enterprise deploys an appliance with an embedded security agent to provide online communications guidance for one or more users of the enterprise. The security agent may provide guidance by assessing risks and determining acceptable online communications.

Web Application Scanner

In some embodiments, a security agent is used to probe a web application in order to find vulnerabilities in the web application. The probing may operate in an iterative fashion by examining all URLs. The security agent may search for inappropriate or unacceptable online communications. The security agent may be a web application security scanner. The security agent may operate in an automated fashion, or be driven by a human. The security agent may use a web browser, emulation, or simulation to probe web applications. The risks may be used to point out the flaws of the web application. Such embodiments of a security agent may scan web applications and find and/or alert a user to flaws or vulnerabilities before a miscreant does.

Up-to-Date Security Agent

In some embodiments, a security agent is periodically updated with new or modified data (such as for example risk information, risk decisions, acceptable parameters, categories, or other data). For example, a client queries a repository for risk information that is updated every minute with the latest risk information, users doing shopping can be ensured that they have the latest information on the risks of performing the online communications. Advantages to such embodiments may include:

users do not need to check the risks themselves
 users do not need to stay informed or up-to-date with the latest malicious happenings or risky destinations to go to Site Seals In some embodiments, a security agent assesses the risks of communicating with one or more web applications displaying a specific website seal. The risk assessment may be stored in a repository for use in risk decisions. The result is provided to a user or client querying about a web application displaying the website seal. For example, a security agent performs a risk assessment on one or more web applications displaying a specific website seal, the risk assessment is used by one or more clients querying about the risk information of communicating with a web application displaying the website seal.

A security agent assesses the risks of a type of site seal (e.g. examining and assessing risk of one or more web applications that display the site seal) and assigns a category to the site seal. The risk assignment may be used later on to help ensure acceptable or adequate risk for online communications. For example, a security agent examines and assesses the risk of one or more web applications that carry a specific site seal from a specific vendor and assigns this to a category, then the risk information is used to guide and/or help improve security of online communications for one or more users.

OTHER EMBODIMENTS

In some embodiments, a security agent is situated local to a client, the security agent monitors online communications and ensures sensitive data is released only to acceptable destinations, or over acceptable communication channels. The security agent determines the risks of communicating with the destination or over the communication channel and determines whether appropriate or acceptable for the sensitive data.

In some embodiments, a security agent is situated remote from one or more clients where a client queries the security agent for the risks of an online communication. The online communication may be one or more of: a web application, website, domain, URL, server, communication channel, network, or other communication element. For example, "Is https://www.xyz.com safe enough for online banking"

In some embodiments, a security agent is embedded in a smartcard that accesses one or more risk decisions and performs the actual online communications with the destination, and a client application (such as for example a web browser) communicates with the security agent. Such embodiments may provide the advantage that a security agent ensures the risks are acceptable or adequate.

In some embodiments, a security agent is embedded in an external hardware device (such as a dongle, USB key, or other hardware), and client traffic is directed through the security agent.

In some embodiments, a security agent is able to monitor communications by being embedded within a shared library that has access to online communications, the security agent determines and assesses the risk of the online communications and/or determines whether the risks are acceptable. For example, a security agent is added to the Windows® wininet.dll, unacceptable communications are blocked, flagged, or a user is alerted.

In some embodiments, a security agent helps to ensure online communications are acceptable by being embedded within a web proxy that has access to online communications. The communications may be business communications, personal, or other. For example, a security agent is included within web proxy that is deployed by an enterprise, the security agent helps to ensure all of the enterprises employees online communications are acceptable.

In some embodiments, an entity improves security for their users by deploying a centralized security agent that ensures online communications are acceptable or adequate for its users. For example, an entity (such as for example an ISP, government department, enterprise, school, or the like) monitors online communications between a user and entities on the Internet and ensures communications are acceptable.

In some embodiments, a security agent is used by entities (such as for example ISPs, enterprises, schools, government departments, or the like) to monitor network traffic, analyze risks, and determine whether the risks are acceptable for its users. For example, a security agent provides a mode for "Online Banking Only" where a set of risk decisions are assessed to ensure online communications meet acceptable parameters by blocking network traffic, or raising alerts for communications that do not.

In some embodiments, security agents are deployed/provided by online merchants, financial institutions, vendors, or other entities to provide guidance to one or more of their users. The guidance may help to improve client-side security In some embodiments, a security agent is used by sales personnel that frequently travels and accesses the Internet through unknown or potentially hostile networks, the security agent assesses risk of the online communications and provides guidance as to which online communications are acceptable or adequate for the data being transmitted or the transaction type being performed. The unknown or potentially hostile networks may for example include WiFi hotspots, hotel networks, or the like.

In some embodiments, a service checks the details about communicating with a destination and provides guidance to one or more client applications regarding the risks of communicating with the destination. For example, a DNS service performs a risk assessment of communicating with a destination and provides risks guidance by preventing access to destinations considered unacceptable.

In some embodiments, a security agent is used to assist in complying with policies, regulations, etc. . . . . For example, a security agent is used by an enterprise to help ensure its employees are adhering to various regulations such as for example PCI.

In some embodiments, a cellphone carrier deploys a security agent to help ensure their users online communications are secure by monitoring release of sensitive data and ensuring acceptable online communications are being used. For example, a cellphone carrier deploys a security agent within their network which monitors users online communications and helps to ensure their online communications are with acceptable destinations.

In some embodiments, a security agent is integrated with or embedded into a desktop application to help determine the risks of online communications. The risks may be provided to a user, or used to determine whether the communications are acceptable/adequate for the type of communication. Examples of desktop applications may include anti-virus, anti-malware, personal firewalls, anti-phishing, user security software, or other software application. For example, a desktop application monitors online communications to assess the risks and provide guidance to one or more users as per to the online communications.

In some embodiments, a security agent is deployed by an enterprise where users outside of the physical perimeter of the enterprise route online communications to the Internet through the enterprise-deployed security agent. The security agent may be integrated with an application proxy, web proxy, or the like. One or more users may make use of the security agent. For example, a virtual private network (VPN) is setup from the user to the enterprise, network traffic is routed through the VPN to a web proxy containing a security agent within the enterprise, the security agent monitors communications and provides guidance to the user regarding the risk of their online communications.

In some embodiments, a security agent can be queried for risk information. The security agent may be an online security provider. The risk information may include risk assessment results. The query may include identifying information such as for example a web application, domain, URL, web server, or other server identification. The query may include a data type, transaction type, sensitive data, category, or other information. Examples of online security providers may include antiphishing lists, DNS providers, online advisory systems, or other systems.

In some embodiments, a security agent monitors online communications and provides guidance for a user and/or helps ensure proper online communications. For example, a security agent monitors a users web browsing and assesses the risk of a redirection (such as for example URL shorteners that provide redirection) for one or more users to provide web browsing guidance and/or security functionality. Another example, HTML documents, HTML links, references, or documents provided by a social media are assessed for risks and possibly checked if they are acceptable, adequate, or satisfactory for an online communication.

Although we refer to SSL and TLS, this should not be construed to be limited to just SSL and TLS but also include any possible secure Internet communication protocol or successor to SSL/TLS.

Information obtained from performing a risk assessment of one or more of the client, destination, communication channel, or network connection—may influence a decision of whether or what type of communications should be allowed or not allowed.

The information obtained from such a risk assessment may help lead to a better decision as to whether online communications should be allowed or not allowed. Better decisions may lead to improved security as well as improved usability.

By performing and evaluating a risk assessment of the various components involved in online communications—various embodiments of a security agent may thwart or even prevent one or more security attacks or holes such as for example:

Phishing attacks may be lessened by analyzing the risks of the destination and/or communication channel Pharming attacks may be lessened by analyzing the risks of the destination and/or network access Evil twin attacks may be lessened by analyzing the risks of network access and/or communication channel Man-in-the-middle attacks may be lessened by analyzing the risks of network access and/or communication channel and/or the destination Hijacking attacks may be lessened by analyzing the risks of communication channel and/or the destination and/or network access Trusted Root certificate manipulation attacks may be lessened by analyzing the risks of the client and/or destination certificates Malicious HTML form manipulation or malicious javascript may be lessened by analyzing the risks of the destination and/or communication channel DNS poisoning may be lessened by analyzing the the risks of the destination and/or communication channel and/or network access Use of weak cryptographic keys or algorithms may be restricted by analyzing the the risks of the destination certificate and/or communication channel Ability to roam using uncontrolled or unknown networks by analyzing the risks of network access and/or communication channel and/or the destination Usage Scenarios Other embodiments may be used in a wide variety of scenarios such as for example:

Provide the risks of an online communication to a user, another entity, or component to influence online communications.

Provide appropriate transaction types and/or sensitive data and/or sensitive data types appropriate for an online communication.

Risk assessment and/or acceptable risks are determined by a party other than the user and then provided to users or enterprises as a service.

Risk assessment and/or acceptable risks are used to inform or prevent the user from performing risky online communications. For example, a search engine may use the risk assessment to prevent redirecting a user to a potentially risky site.

Risk assessment and/or acceptable risks are used by a software application (e.g. Anti-Virus, Firewall, web browser, or the like) to possibly improve online communications.

Assess and online communication for example to determine whether the online communication is suitable for release of sensitive data. For example, ensure financial information is only ever released over a proper online communication or banking destination.

Help ensure release of sensitive data only under acceptable conditions.

A security agent may determine the risks for an entity communicating with another entity before sharing of data, resources, or the like.

A security agent may be configured with different profiles for the members each with different acceptable risks or risk profiles. For example—a home environment a child profile may be more restrictive in their online communications to help prevent online predators, inappropriate content, or otherwise undersired communications.

A security agent is used to help an enterprise comply with a policy.

Honeypot to create blacklists. For example, bogus bank accounts are used in collecting and following URL links—any resulting transactions are used to flag various components of the online communication.

Figure 16:
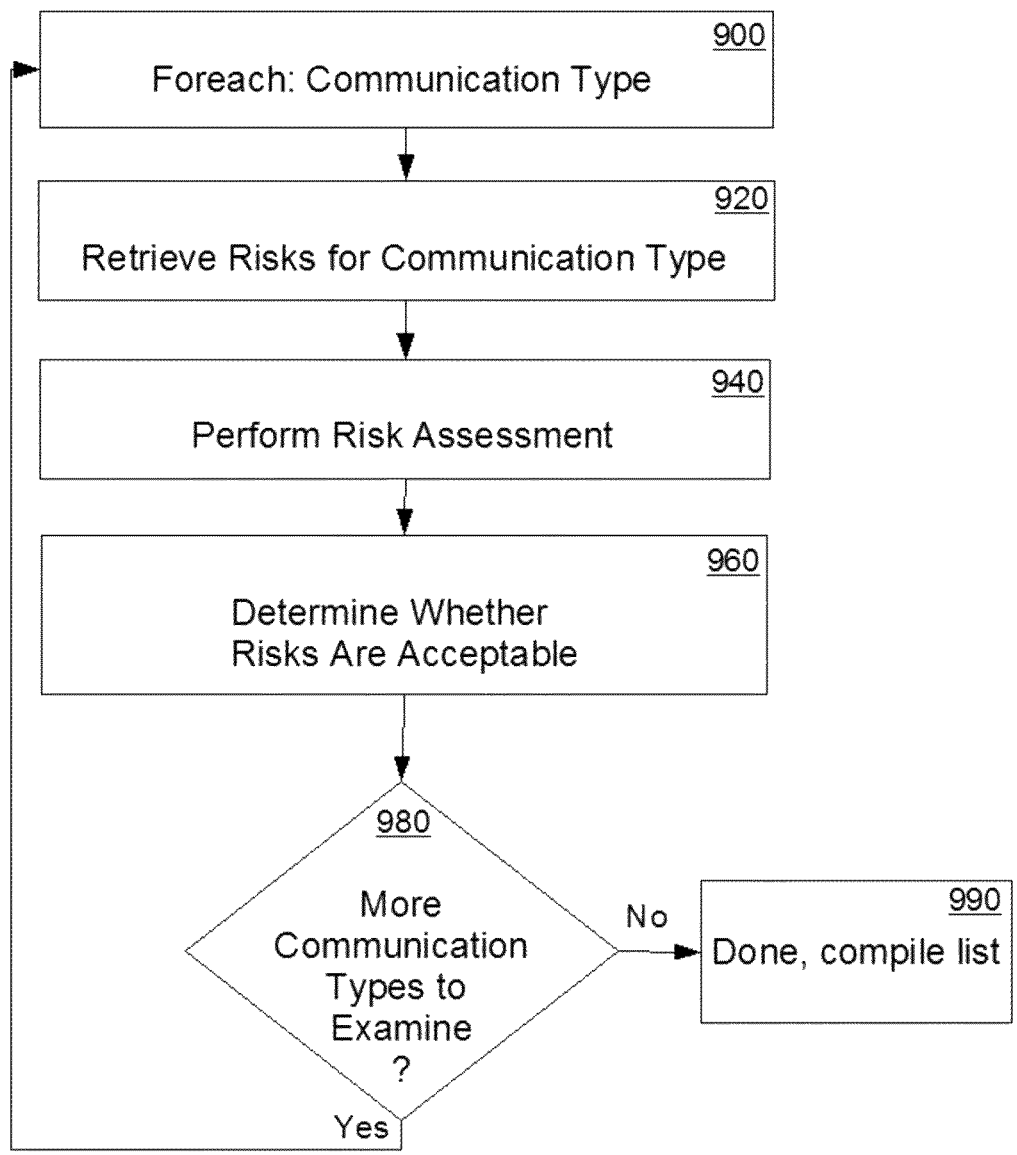
FIG. 16 is a flow chart diagram illustrating a security agent determining acceptable communication types, in accordance with one embodiment.

FIG. 16 illustrates an example of an embodiment used to assess what an online communication is acceptable for. For example, such an embodiment may be used by search engines, websites, enterprises, services, banks, or the like to help ensure acceptable online communications for their users. Operation 900 determines an online communication type (e.g. by iterating over a set of online communication types such as using a for-loop). The risks for that online communication type are retrieved from a repository 920 followed by a risk assessment performed using the risks 940. The risks are examined whether they are acceptable and noted 960. The number of online communication types are examined if there are more to examine 980 and if there are then operation 900 is restarted. However, if at operation 980 there are no further online communication types to examine then the list is compiled of all acceptable and non-acceptable online communication types for the online communication 990.

Some Advantages

Various embodiments provide (but are not limited to) one or more of the following advantages:

Solves various security issues at one chokepoint—before sensitive data is transmitted or released over an online communication Improves usability by helping user with non-trivial tasks of understanding risks of online communications such as for example: reading certificates, following certificate chains, understanding implications of a Certificate Policy Statement (CPS), underlying technology, latest happenings in security, aggregating risk details of online communications, or the like More efficient due to automating of some tasks Less susceptible to a user forgetting to or being misled in examining security risks Removes need for user training to determine risks themselves Increased information may help user in determining whether online communications can proceed in an otherwise insecure environment Improved reliability Provide enterprises with more control over their users online communications. The enterprise may wish to control their enterprise data and release of enterprise data or help assist their users release of their personal sensitive data or performing online transactions. By determining online communication risks an enterprise may be able to control the online communications such as proper release of sensitive data or when online transactions are performed.

By displaying risks, a user may be able to better decisions on whether the conditions are acceptable for online communications and/or whether to proceed.

Providing details on what type of communications are appropriate or allowed may provide improved usability. For example, examining the SSL server certificate of a destination and determining appropriate online communications such as banking, personal email, enterprise grade data, or the like.

Security agent is generic—risk decisions can be applied across any electronic communication network.

Risk decisions can be extended, changed, or removed as needs change.

Provide risk information where otherwise not provided or hard to obtain. For example, some smart phones may not display SSL certificates of a destination and a security agent performing risk assessment and/or acceptable online communication determination.

Provide risk information where otherwise some users wouldn't know how to obtain. For example, users may not know the commands or tools to invoke to examine risks.

SOME TERMINOLOGY

Acceptable Parameters: values, thresholds, or other indications of what define acceptable instances of a risk decision Online Communication: transmission or receipt of sensitive data, or performing sensitive operations.

Online Communications: plural of online communication. Multiple online communications (either concurrently and/or in sucession).

Online Communication Element: one of the elements used in online communications (client, destination, communication channel, network).

Online Communication Sub-element: a specific sub-element of an online communication element Acceptable Communications: online communications that are deemed adequate, acceptable, authorized, or allowable.

Risk: an element that may be harzardous or increases the possibility of something unintended to happen Risk Decision: a decision that may determine whether a risk is present or how likely. Risk decisions may consist of one or more of:
communication element
acceptable parameters Risk Decisions may be implemented in a variety of ways such as one or more of the following:
Rule: use rules to determine the possibility or extent of a risk.
Policy: use policies to determine the possibility or extent of a risk
Hardcoded: use software/hardware code to define the risk decisions
Scripts: risk decisions are defined in a scripting language (so possibly dynamically interpreted)

Risk Threshold: a boundary that when crossed indicates either an increase or decrease in risk. Some risk decisions may have none, one, or more than one risk thresholds.

Acceptable Risk: risk that is either not present or at a level that is not considered insecure.

Risk Assessment: Assessing one or more risk decisions to determine the overall risk.

Risk Score: Assigning a score to a risk assessment.

In various embodiments of the invention, the operations discussed herein, e.g., with reference to the figures may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

As discussed herein, various operations may be performed by logic (e.g., software, hardware, firmware, combinations thereof, etc.). For example, the logic may include logic provided via a computer. In some embodiments, the computer may include: volatile (such as random access memory (RAM)) or non-volatile (such as flash memory, hard drive, optical storage device, etc.) device(s); one or more processors (e.g., to execute instructions and/or operate on data stored in the storage device(s)), and/or one or more buses or interconnects to couple various components of the computer, such as a network (e.g., wired or wireless network) interface device (which allows communication with other computers coupled to the network), a display device (e.g., a monitor to display images, data, etc. generated by the computer or other computers). In some embodiments, the client, security agent, and/or desination may each include one or more of the components discussed above with reference to a computer. For example, the security agent/client/destination/etc. may include one or more processors (having one or more processor cores) to perform operations discussed herein and/or a storage device or memory to store various data discussed herein.

Also, in the description and claims, the terms "coupled" and "connected" along with their derivatives, may be interchangeable. In some embodiments of the invention, these terms may be used to indicate that two or more elements are in direct physical or electrical contact with each other. However, these terms may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
examining a certificate, wherein the certificate can be used to secure a communication channel;
identifying the issuer of the certificate;
retrieving a risk rating of the issuer of the certificate; and
providing guidance regarding risks of communication over the communication channel based at least in part on the risk rating of the issuer.

2. The method of claim 1, further comprising configuring risk ratings for certificate issuers.

3. The method of claim 1, further comprising determining risk ratings at least partly based on due diligence performed by certificate issuers.

4. The method of claim 3, wherein a level of the due diligence performed by the certificate issuers is pre-assessed.

5. The method of claim 1, wherein the provided guidance influences communication over the communication channel.

6. The method of claim 5, wherein the influencing includes one or more of: allowing communications, blocking communications, data communicated, and type of data communicated.

7. The method of claim 1, wherein the provided guidance is intended for automation.

8. The method of claim 1, wherein the provided guidance is intended for a human user.

9. The method of claim 1, wherein the provided guidance is in the form of a numerical score, alphabetic grade, graphical representation, dashboard, scale, or other risk score.

10. The method of claim 1, wherein the provided guidance is based on acceptable parameters for a specified category.

11. The method of claim 1, wherein the secure communication channel is Secure Communication Layer (SSL) or Transport Layer Security (TLS).

12. The method of claim 1, wherein the certificate is an x.509v3 certificate.

13. A non-transitory computer-readable medium having instructions stored thereon that when executed cause a processor to:
   examine a certificate, wherein the certificate can be used to secure a communication channel;
   identify the issuer of the certificate;
   retrieve a risk rating of the issuer of the certificate; and
   provide guidance regarding risks of communication over the communication channel based at least in part on the risk rating of the issuer.

14. The non-transitory computer-readable medium of claim 13, further comprising configuring risk ratings for certificate issuers.

15. The non-transitory computer-readable medium of claim 13, further comprising determining risk ratings at least partly based on due diligence performed by certificate issuers.

16. The non-transitory computer-readable medium of claim 13, wherein the provided guidance influences communication over the communication channel.

17. The non-transitory computer-readable medium of claim 13, wherein the provided guidance is intended for automation.

18. The non-transitory computer-readable medium of claim 13, wherein the provided guidance is intended for a human user.

19. The non-transitory computer-readable medium of claim 13, wherein the provided guidance is in the form of a numerical score, alphabetic grade, graphical representation, dashboard, scale, or other risk score.

20. The non-transitory computer-readable medium of claim 13, wherein the provided guidance is based on acceptable parameters for a specified category.

* * * * *